United States Patent [19]

Ueguri et al.

[11] Patent Number: 4,594,498
[45] Date of Patent: Jun. 10, 1986

[54] PULSE ARC WELDING MACHINE

[75] Inventors: Shigeo Ueguri; Youichiro Tabata; Hirotsugu Komura, all of Hyogo; Toshio Ito, Aichi, all of Japan

[73] Assignee: Mitsubishi Denki Kabushiki Kaisha, Tokyo, Japan

[21] Appl. No.: 534,540

[22] Filed: Sep. 22, 1983

[30] Foreign Application Priority Data

Mar. 31, 1980 [JP] Japan .................................. 55-41354

[51] Int. Cl.⁴ .............................................. B23K 9/09
[52] U.S. Cl. .......................... 219/137 PS; 219/130.21; 219/130.51
[58] Field of Search ...................... 219/130.51, 130.21, 219/137.71, 137 PS, 130.4

[56] References Cited

U.S. PATENT DOCUMENTS

| | | | |
|---|---|---|---|
| 2,784,349 | 3/1957 | Anderson | 219/130.4 |
| 3,528,100 | 9/1970 | Budy | 219/130.51 |
| 3,851,137 | 11/1974 | Verhagen et al. | 219/130.21 |
| 3,906,184 | 9/1975 | Gibbs et al. | 219/130.21 |

FOREIGN PATENT DOCUMENTS 521089 9/1976 U.S.S.R. ........................ 219/130.51

Primary Examiner—Clifford C. Shaw
Attorney, Agent, or Firm—Sughrue, Mion, Zinn, Macpeak & Seas

[57] ABSTRACT

A pulse arc welding machine in which the welding operations and welding current are controlled such that the molten portion of a wire electrode is not significantly splattered and the welding arc length and welding bead are uniform. The welding machine of the invention includes a wire electrode, a welding torch confronting a base material while being spaced therefrom, a shielding gas supplying unit for supplying a shielding gas to the welding area on the base material, and a wire feeding unit for feeding the wire electrode to the welding torch. A base current source supplies a base current between the wire electrode and base material with a pulse current from a pulse current source being imposed thereon. A pulse frequency varying circuit varies a number of pulses per unit time for the pulse current so that the number of pulses is proportional to the speed at which the wire electrode is fed thereby to set the average arc current.

14 Claims, 38 Drawing Figures

4,594,498

PULSE ARC WELDING MACHINE

BACKGROUND OF THE INVENTION

The present invention relates to pulse arc welding machines. More particularly, the invention relates to a pulse arc welding machine in which a pulsive arc current (hereinafter referred to as "a pulse current") is periodically superposed on a primary welding DC current applied between a wire electrode and a base material. The primary welding DC current is hereinafter referred to as "a base current". The molten portion of the wire electrode is formed into small drops by an electromagnetic contraction force due to the pulse current. The molten drops are transferred (spray-transferred) to the base material, thus achieving the welding operation.

With a pulse arc welding machine of this general type, even if the average current value is low, the spray transfer is effected. That is, the welding characteristics of the machine are considered excellent.

With a conventional DC arc welding machine or a $CO_2$ welding machine, it is impossible to carry out spray transfer welding in a small average current range. Accordingly, the welding operation must be carried out by short-circuiting transfer welding. Therefore, the conventional welding machine is disadvantageous in that, when the wire electrode is short-circuited, the molten metal tends to splatter onto the base material, the torch, or other units. In order to eliminate this drawback, a so-called "pulse arc welding machine" has been proposed in the art in which the arc current is produced in the form of a pulse to make it possible to carry out the spray transfer welding in a small average welding current range.

The conventional pulse arc welding machine will be described.

In the power source of the conventional pulse arc welding machine, the number of pulses produced per unit time is equal to an integer multiple of the fundamental power frequency, and the base current and/or the pulse width varies according to the wire feeding speed as shown in FIGS. 1A and 1B. FIG. 1A shows an example of the waveform of the welding current (or the arc current), i.e. the composite current of the base current and the pulse current, which is provided for a reduced wire feeding speed and decreased average welding current (or the average arc current). As is apparent from the waveform, all of the base current 12, pulse current 10 and pulse width $\tau$ are small. On the other hand, FIG. 1B shows an example of the waveform of the welding current which is produced for an increased wire feeding speed and increased average welding current. All of the base current 12, pulse current 10 and pulse width $\tau$ are large.

Accordingly, when a welding operation is carried out in a small average welding current range with the conventional pulse arc welding machine as described above, the peak value of the pulse current is small and accordingly the electromagnetic contraction force due to the pulse current is also small. Therefore, it is difficult to transfer the molten metal in the form of small droplets. That is, the molten portion of the wire electrode is transferred in the form of a considerably large molten metal drop 16 to the base material 18, as shown in FIG. 2A, as a result of which the base material suffers greatly from the splattering phenomenon.

On the other hand, when a welding operation is carried out in a large average welding current range with the conventional pulse arc welding machine, the quantity of heat applied to the wire 20 is excessively large so that the molten metal drop 16 droops as shown in FIG. 2C. As a result, even if the arc length is set long, the wire is short-circuited with the base material momentarily. If the arc length is short, the wire is certain to be short-circuited to the base material. When the wire and the base material are short-circuited in this way, the molten portion of the wire tends to splatter. As shown in FIG. 2C, the time instant the molten drop 16 leaves the wire 20 is much later than the time instant the pulse current reaches its peak value, that is, separation occurs during the period in which only the base current flows. Therefore, when the base current is small and the no-load voltage of a power source supplying the base current is low, the arc 22 will be broken and accordingly the wire 20 being fed will stick to the base material 18, thus again resulting in splattering of the molten metal. This difficulty may be eliminated by carrying out the welding operation with the arc length set long. However, this technique is still disadvantageous in that the shielding gas will then be caught up by the welding bead or an undercut will be created in the base material, which makes it impossible to increase the welding speed. Due to these reasons, the welding operation of a conventional welding machine still involves problems to be solved.

As described above, the conventional pulse arc welding machine suffers from various drawbacks. In addition, it has a difficulty in adjustment that, in order to obtain a molten drop transfer state in which little undercutting occurs in the base material, i.e. a satisfactory molten drop transfer state, the wire diameter, the wire material and shielding gas must be selected within strict limits.

Furthermore, if splattering of the molten metal of the wire electrode occurs, the control unit may be damaged and it is necessary to perform additional work to remove the molten metal which has splattered onto the base material, which reduces the efficiency of the welding work.

SUMMARY OF THE INVENTION

Accordingly, a primary object of the invention is to provide a pulse arc welding machine in which all of the above-described difficulties accompanying a conventional pulse arc welding machine are eliminated and the molten portion of a wire electrode is not significantly splattered.

Another object of the invention is to provide a pulse arc welding machine in which, within a wide average welding current range, the arc length is uniform and the welding bead is also uniform.

A further object of the invention is to provide a pulse arc welding machine in which, within a wide wire feeding speed range, the arc length is uniform and the welding bead is also uniform.

A still further object of the invention is to provide a pulse arc welding machine in which a satisfactory molten drop welding condition can be readily obtained.

A particular object of the invention is to provide a pulse arc welding machine in which a pulse arc welding operation can be suitably and stably carried out under a wide range of welding conditions.

The foregoing objects and other objects of the invention have been achieved by the provision of a pulse arc welding machine which, according to the invention, includes a wire electrode, a welding torch which confronts a base material spaced therefrom, a shielding gas supplying unit for supplying a shielding gas to the welding point of the base material, a wire feeding unit for feeding the wire electrode to the welding torch, a base current source for supplying base current between the wire electrode and the base material, a pulse current source for supplying pulse current between the wire electrode and the base material, and a pulse frequency varying circuit for setting the number of pulses per unit time of the pulse current from the pulse current source so as to be proportional to a speed of feeding the wire electrode and to thereby set an average arc current.

The nature, principle and utility of the invention will become more apparent from the following description when read in conjunction with the accompanying drawings.

DESCRIPTION OF THE PREFERRED EMBODIMENT

Figure 3:
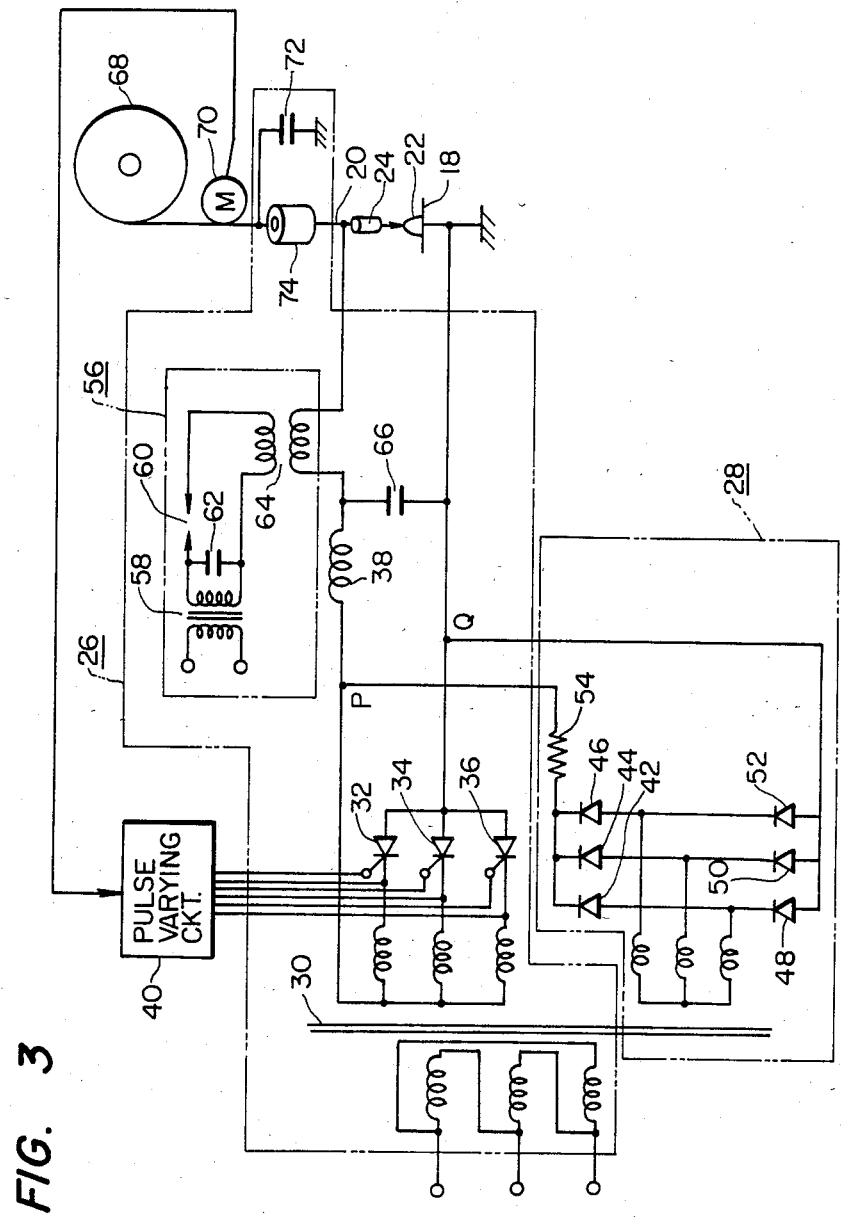
FIG. 3 is a circuit diagram showing the arrangement of a first preferred embodiment of a pulse arc welding machine according to the invention.

A first preferred embodiment of a pulse arc welding machine according to the invention is shown in FIG. 3, in which reference numeral 24 designates a welding torch having a shielding gas jetting hole and a central portion through which a wire electrode 20 passes, 26 a main power source, and 28 an auxiliary power source.

The main power source 26 includes a transformer 30 for setting an input supply voltage to a predetermined value and electrically isolating the input and the output; semiconductor active elements 32, 34 and 36 such as thyristors which subject sine wave input voltage waveforms to rectification and pulse voltage waveform shaping by being fired at predetermined phases; a DC reactor 38 for protecting a power supply circuit from short-circuiting and for shaping a pulse current waveform; and a circuit 40 for varying the number of pulses per unit time, hereinafter referred to as "a pulse frequency varying circuit 40" when applicable. The pulse frequency varying circuit 40 operates to detect the motor speed of a wire feeding unit 70 or the motor's armature voltage (which varies in response to the motor speed) thereby to vary the pulse frequency.

The auxiliary power source 28 includes rectifying diodes 42, 44, 46, 48, 50 and 52 and a current limiting resistor 54.

A high frequency electric source 56 is incorporated in the main power source 26 and includes a booster transformer 58, a spark gap 60, and a capacitor 54. When the spark gap 60 is triggered, the high frequency electric source 56 resonates in association with the capacitor 62 to produce a high-frequency high voltage. The high frequency electric circuit 56 further includes a coupling coil 64 for applying the high-frequency high voltage thus produced between the wire electrode 20 and a base material 18.

Further in FIG. 3, reference numeral 66 designates a bypass capacitor for preventing the application of the above-described high-frequency high voltage to the side of the transformer 30, 68 a reel on which the wire electrode 20 is wound, 70 the aforementioned wire feeding unit, 72 a bypass capacitor for preventing the application of the high-frequency high voltage to the wire feeding unit 70, and 74 a cylindrical magnetic body, for instance, a ferrite material, which is disposed between the welding torch 24 and the wire feeding unit 70 and which has hole formed therein to allow the wire electrode 20 to pass through.

The operation of the pulse arc welding machine thus constructed will be described.

After being increased by the booster transformer 58, an input voltage is applied across the spark gap 60. When the input voltage reaches a certain limit value, a discharge is caused in the spark gap. As a result, a series resonance circuit is formed by the capacitor 62 and the coupling coil 64 which produces the high-frequency high voltage which is applied between the wire electrode 20 and the base material 18. In this operation, the application of the high-frequency high voltage to the side of the transformer 30 is prevented by the bypass capacitor 66 while the application of the high-frequency high voltage to the wire feeding unit 70 is prevented by the bypass capacitor 72 and the cylindrical magnetic body 74 which serves as a high frequency limiting impedance. Thus, the power source circuit and the wire feeding unit are completely protected from the high-frequency high voltage.

An electric discharge is caused between the wire electrode 20 and the base material by the high-frequency high voltage. Since this discharge maintaining voltage is high and it is often difficult to maintain the discharge using only the pulse voltage which is supplied by the main power source, the auxiliary power source 28 is provided to supply a no-load voltage which is substantially higher than the discharge maintaining voltage. More specifically, after the voltage is supplied by the auxiliary power source 28, a pulse voltage is supplied by the main power source 26 to feed the pulse current while at the same time the wire electrode 20 is fed by the wire feeding unit 70 so that the welding operation is carried out.

As is apparent from the above description, the welding operation can be started with the wire electrode separated from the base material. Therefore, with the pulse arc welding machine of the invention, the occurrence of the splattering phenomenon which might otherwise be caused at the start of a welding operation is prevented.

The auxiliary power source 28 is used to supply current at the arc starting time as described above and to maintain the arc between the pulses supplied by the main power source. Therefore, the auxiliary power source 28 is so designed as to supply a required amount of current at all times. This current corresponds to the base current 12.

By turning on the thyristors 32, 34 and 36 with the pulse frequency varying circuit 40, the main power source 26 provides a pulse current for which the pulse frequency is 180/second at the maximum. For simplification in description, a single pulse will be considered for the case where no base current is provided.

Figure 4A:
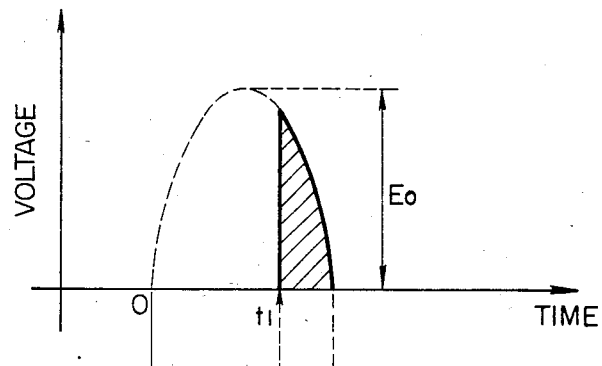
FIGS. 4A, 4B are diagrams showing the waveforms of a pulse voltage and a pulse current.
Figure 4B:
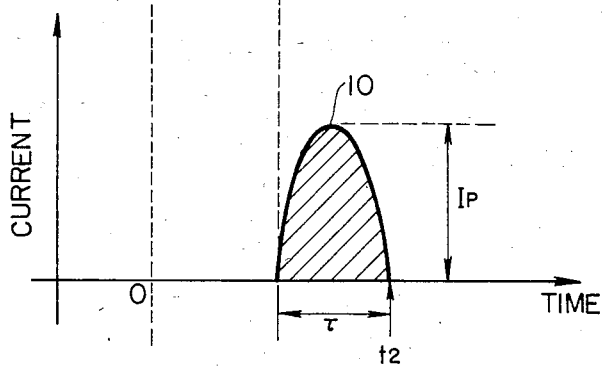

FIGS. 4A and 4B show, respectively, the pulse voltage which is provided during the no-load period in which no voltage is applied across the circuit points P and Q by the auxiliary power source 28 and the pulse current which flows when the welding arc is generated by applying the pulse voltage. In FIGS. 4A and 4B, reference character $E_0$ designates the peak value of the secondary voltage on the main power source side of the transformer 30, T the time width of a half period corresponding to the fundamental power source frequency, $t_1$ the time instant of firing the thyristors 32 through 36, $I_P$ the peak value of the pulse current, and $t_2$ the time instant when the pulse current from the power source 26 returns to zero.

Figure 2A:
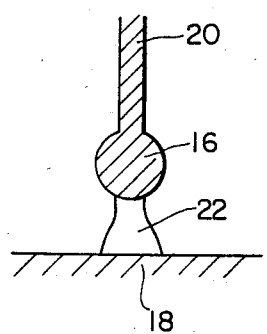
FIGS. 2A–2C are explanatory diagrams showing various states of a molten drop transferring to a base material.
Figure 2B:
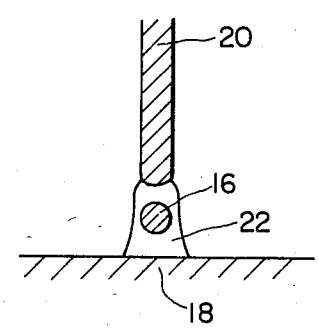
Figure 2C:
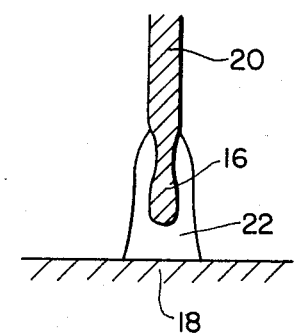

Values $Q_1$ and $Q_2$, which relate to the amount of heat applied to the wire, are defined as:

$$Q_1 = \int_{t_1}^{t_2} i\,dt \text{ and } Q_2 = \int_{t_1}^{t_2} i^2\,dt,$$

where i is the pulse current (instantaneous value). The value $Q_1$ represents the area of a shaded part of the pulse current waveform shown in FIG. 4B. First, with the peak value $E_0$ fixed, the time instant $t_1$ is changed by the pulse frequency varying circuit 40. In the case where the time instant $t_1$ occurs late, the peak vaue $I_p$ and the pulse width of the current flowing between the wire electrode 20 and the base material 28 are small and accordingly spray transfer welding is not effected. That is, as shown in FIG. 2A, the drop transfer welding state is then effected. On the other hand, if the time instant $t_1$ is made to occur early so that the peak value $I_p$ exceeds the critical current value $I_{co}$ (which is a current value defined by the type of shielding gas employed, the material of the wire, and the diameter of the wire) and the amount of heat applied to the wire per pulse is sufficient to melt the wire to form a molten drop at the spray shift time, then the spray transfer welding state is achieved as indicated in FIG. 2B. However, if the time instant $t_1$ is made to occur excessively early, then the sum of the arc heat and the Joule heat of the extending portion of the wire 20, i.e., the amount of heat applied to the wire 20, becomes excessive, as a result of which the drop shift welding state is obtained as indicated in FIG. 2C. In order to obtain a suitable spray transfer welding state, it is necessary to set the peak value $I_p$ to a value higher than the critical current value $I_{co}$ and to set the pulse current waveform so that the amount W of heat applied to the wire, including that due to the base current, is optimum.

A specific technique for setting the current waveform during a pulse period with a small base current applied will be described in detail.

Figure 5:
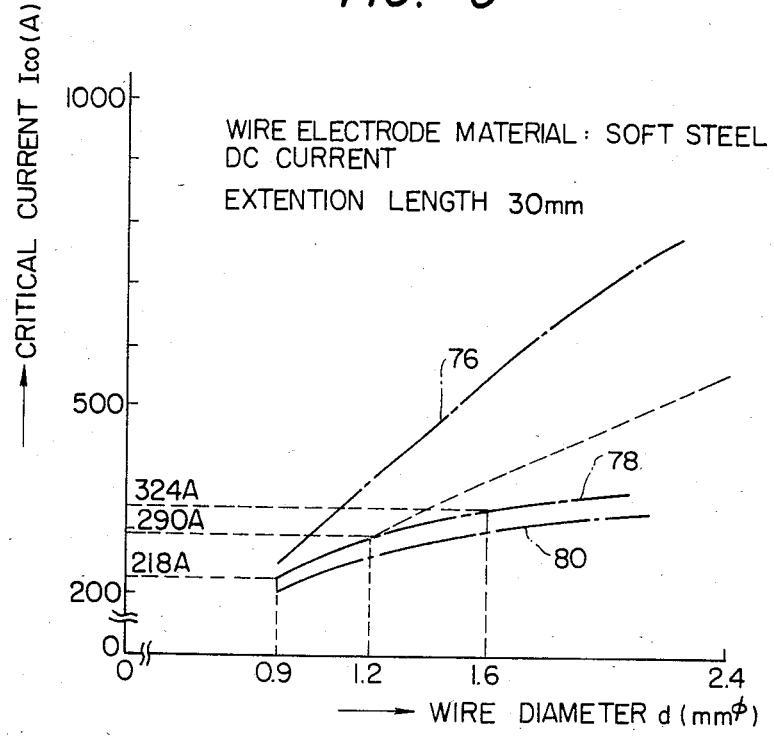
FIG. 5 is a graphical representation relating critical current values $I_c$ with DC current in the case where the material of a wire electrode is soft steel and wire diameter and shielding gas are changed.
Figures 7A, 7B:
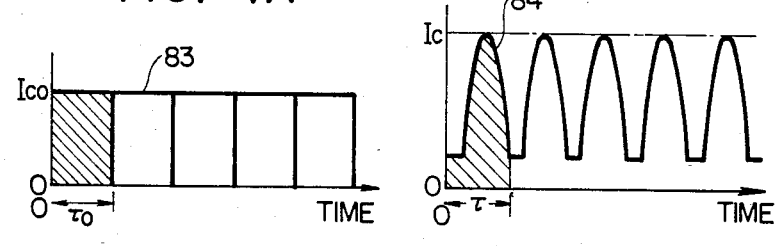
FIGS. 7A, 7B are diagrams showing the DC current and the pulse current.
Figure 8:
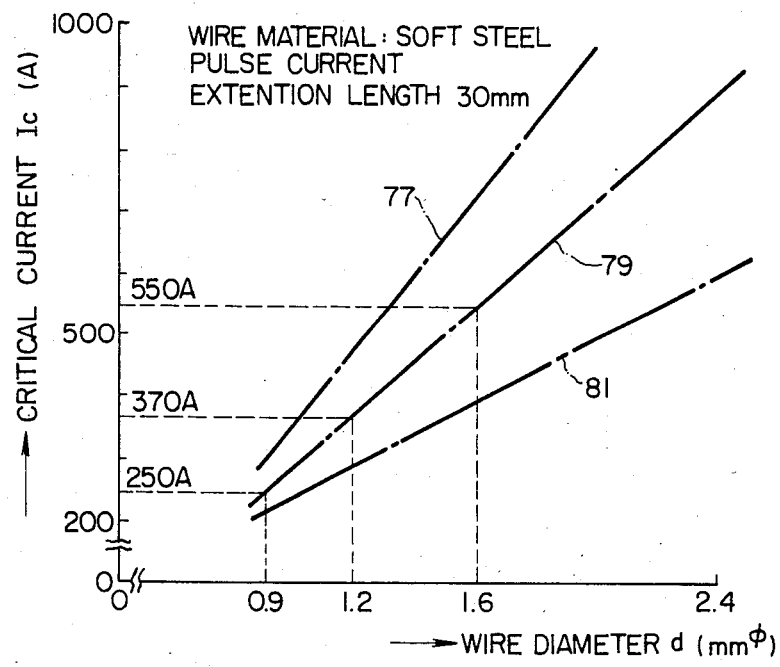
FIG. 8 is a graphical representation relating critical current values and pulse currents when a wire diameter and a shielding gas are changed.
Figure 25:
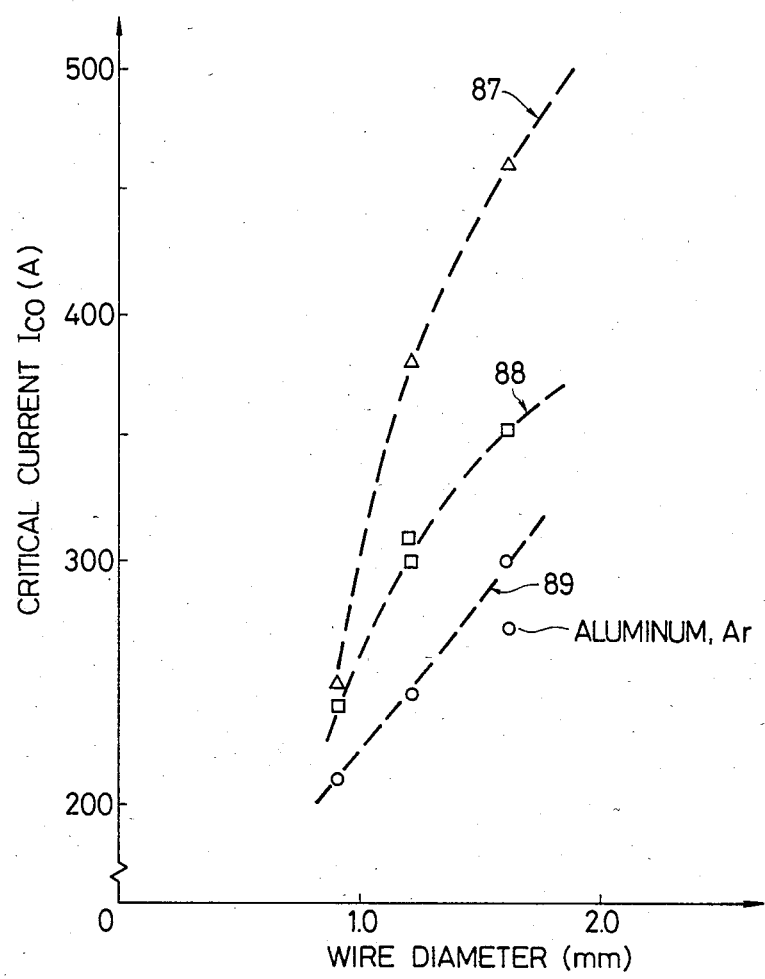
FIG. 25 is a graphical representation relating critical current values and pulse currents for various wire diameters and shielding gases.

FIG. 5 indicates the relations between critical current values $I_{co}$ and wire diameters d, for an extension length of 30 mm, with respect to various shielding gases in the case where the material of the wires is soft steel and the welding current is a DC current 83 as shown in FIG. 7A in which no pulse current is provided. FIG. 25 is similar to FIG. 5 except that the extension length is 20 mm. FIG. 8 indicates the relations between critical current values $I_{co}$ and wire diameters d with respect to various shielding gases in the case where the material of the wire is soft steel and the welding current is a composite current of a small base current and a pulse current 84 as shown in FIG. 7B. In FIGS. 5 and 8, the curves 76 and 77, 78 and 79, and 80 and 81 correspond to shielding gases whose flow rate ratios are Ar:-$CO_2$=6:4, Ar:$CO_2$=8:2 and Ar:$CO_2$=98:2, respectively. In FIG. 25, the curves 87, 88 and 89 correspond to flow rate ratios of 7:3, 8:2 and 97:3, respectively. In each case, the shielding gas is a mixture of Ar and $CO_2$ and the proportion of $CO_2$ ranges from 2% to 40% due to the following reason. The employment of only Ar is not suitable for welding because it will excessively spread the arc. If excessive $CO_2$ gas is mixed in, the critical current value $I_{co}$ will correspondingly be excessively increased. If a pulse current corresponding to the critical current value thus increased is applied, the force of the arc will be increased to considerably deeply fuse the base material 18. In addition, the shielding gas will be caught up in the welding bead as a result of which the welding bead may be irregular.

As is apparent from FIGS. 5, 8 and 25, the critical current $I_{co}$ in the case of the DC current is smaller than that in the case of the base current and the pulse current. For instance, in the case where a shield gas of Ar:-$CO_2$=8:2 and a 1.2 mm $\phi$ wire of soft steel are used, the critical current is of the order of 290 A for the DC current. However, it is of the order of 370 A for the base current and the pulse current.

Figure 1A:
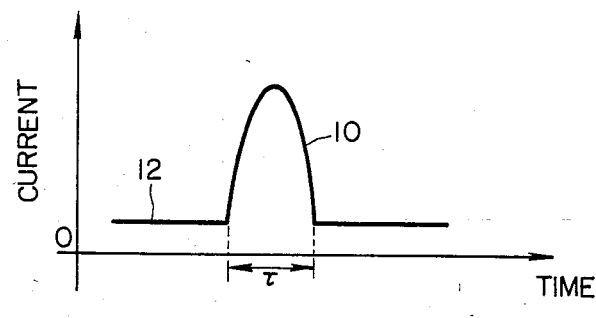
FIGS. 1A, 1B are waveform diagrams showing a pulse current in a conventional pulse arc welding machine.
Figure 1B:
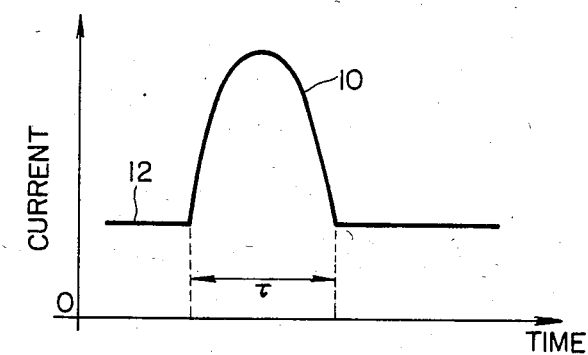
Figure 6:
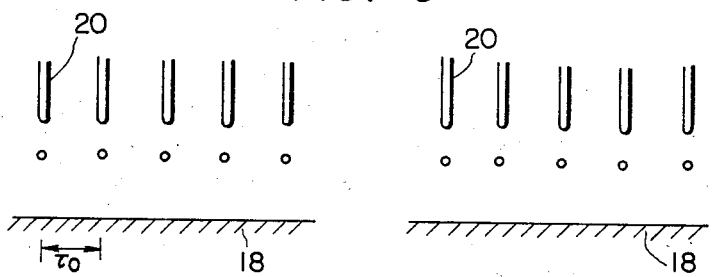
FIG. 6 is an explanatory diagram showing molten metal drops transferring, such as would be observed with a high speed camera, with a DC current and a pulse current.

This can further be understood from the model current waveforms shown in FIGS. 7A and 7B. FIG. 7A is a diagram relating the DC current 83 to the period $\tau_0$ (FIG. 6). FIG. 6 simulates the photographing of a molten drop with a high-speed camera, at a period $\tau_0$ $\tau_0$ representing the time necessary to form and transfer one molten metal drop. The amount of heat applied to the wire during the period $\tau_0$ (the shaded portion of FIG. 7A) is substantially equal to the amount of heat applied to the wire during the period $\tau$ in the pulse current case (the shaded portion in FIG. 7B.) Each of these amounts of heat is sufficient to melt the wire to an extent so as to form one drop. This is in the optimum range of the amount of heat. Thus, if the amount of heat applied to the wire is in the optimum range and at least the peak current value $I_p$ is larger than the critical current value $I_{co}$ in the case of DC current, then satisfactory welding conditions can be obtained. In the case where soft steel wire and a shielding gas of $Ar:CO_2=8:2$ are employed, referring to FIG. 1, an approximate expression for the critical current value $I_{co}$ is as follows:

$$I_{co} = 230d + 10 \text{ (amperes)},$$

where d is the wire diameter in millimeters.

Figure 9:
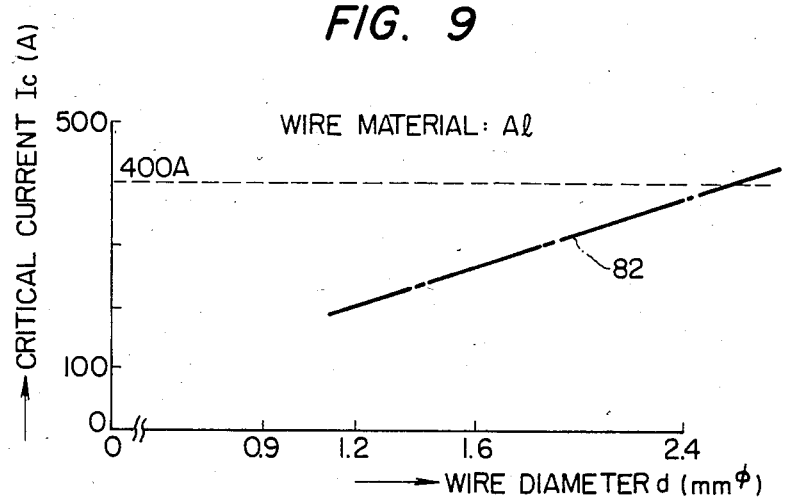
FIG. 9 is also a graphical representation indicating critical current values with wire diameters for an aluminum wire electrode.

FIG. 9 indicates critical current value $I_c$ with pulse current in the case where an aluminum wire 1.6 mm in diameter and a shielding gas of only Ar (Ar being acceptable with aluminum wire) are employed (82, FIG. 9). If, in the case of the aluminum wire, the peak value $I_p$ reaches 400 A or higher, air tends to be caught up in the arc which makes the welding bead defective. Accordingly, it is necessary to limit the peak value $I_p$ to a value higher than the critical current value $I_c$ and to lower than 400 A.

Figure 10:
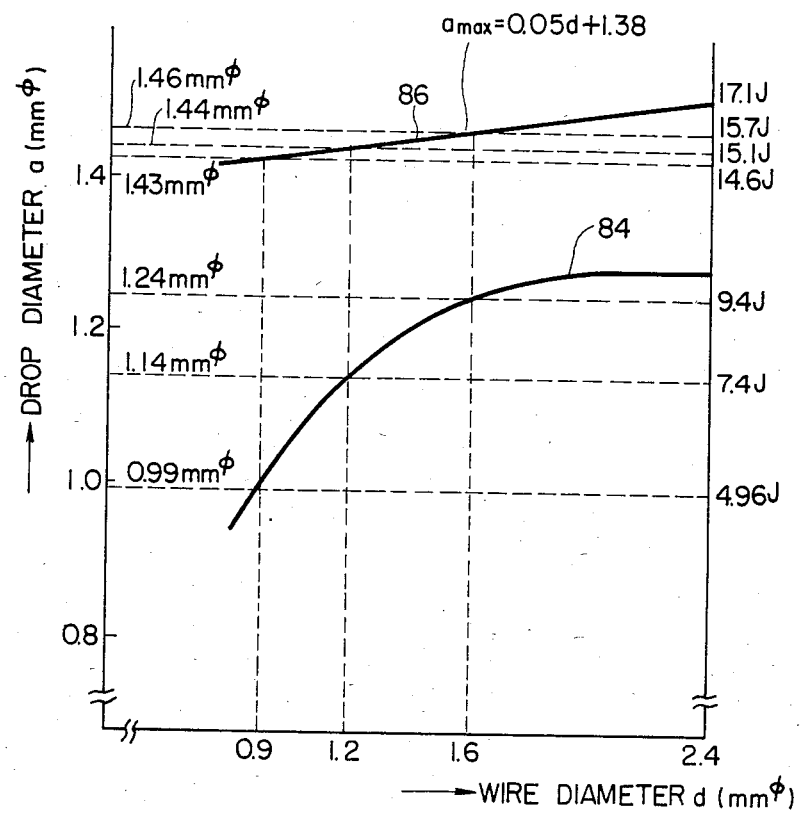
FIG. 10 is a graphical representation indicating molten drop diameters with wire electrode diameters and quantities of heat required for forming such molten drops.

FIG. 10 indicates molten drop diameters with various wire diameters. In FIG. 10, the curve 84 shows actual measurement values in the case where the extension length of each wire is 5 mm. These actual measurement values were obtained when the peak value $E_0 = 165$ V and the peak value $I_p$ is equal to the critical current value $I_c$, and therefore can be regarded substantially as the minimums of drop diameters a.

The values in the right-hand portion of FIG. 10 are the amounts of energy, including latent heat, required for increasing the temperature of a wire, to provide various molten drop diameters, from room temperature (0° C.) to the melting point (1535° C.). It can be seen from FIG. 10 that a wire of 1.2 mm diameter requires an amount of energy of the order of 7.4 Joule.

On the other hand, in order to prevent the occurrence of the drop shift welding states as shown in FIG. 2C, it is essential that the amount of heat applied to the wire 20 per pulse be in a certain optimum range. The curve 86 in FIG. 10 indicates the results of measurement of the quantities of heat which are required for melting the wires to form one drop when, with the base current being 20 A, a satisfactory welding state as indicated in FIG. 2B is changed to an unsatisfactory drop shift welding state as shown in FIG. 2C.

Referring to the curve 86, the diameter $a_{max}$ of a molten drop can be represented by the following expression:

$$a_{max} \cong 0.05d + 1.38.$$

Accordingly, in referring to FIG. 10, the optimum molten drop diameter range and the optimum heat quantity range of a wire electrode of diameter d are as indicated in the following Table I:

TABLE 1

| Wire diameter d (mm ⌀) | Optimum molten drop diameter range (mm ⌀) | Optimum heat quantity range (J) |
|---|---|---|
| 0.9 | 0.99–1.43 | 4.96–14.6 |
| 1.2 | 1.14–1.44 | 7.4–15.1 |
| 1.6 | 1.24–1.46 | 9.4–15.7 |

(Note: The material of the wire electrode is soft steel.)

Table 1 indicates various values in the case where the material of the wire electrode is soft steel. It has been confirmed with a high-speed camera that, also where the material of the wire electrode is aluminum or stainless steel, the optimum molten drop diameter range is applicable for the attainment of the satisfactory spray transfer welding condition as indicated in FIG. 2B. In addition, in the case where the material of the wire electrode is stainless steel, the optimum heat quantity ranges specified in Table 1 are applicable directly because the melting point, the specific heat and the specific gravity of stainless steel are substantially the same as those of soft steel. This has been confirmed through actual experiments. In the case where the material of the wire electrode is aluminum, it has been determined experimentally that the optimum heat quantity range is from 1.95 J to 3.8 J. Accordingly, it is necessary to set the current waveform during one pulse period, i.e. one period of the pulse (the period $\tau$ in FIG. 7), in such a manner that it is within an optimum heat quantity range as described above.

The quantity W of heat applied to the wire by the current during one pulse period is the sum of a quantity of heat $W_1$ attributed to arc heat and a quantity of heat $W_2$ attributed to the Joule heat of the extended portion of the wire corresponding to the length from the current feeding point of the tip in the torch 24 to the end of the arc. W is defined by:

$$W = W_1 + W_2 = A \int_{t_3}^{t_4} i\,dt + B \int_{t_3}^{t_4} i^2 dt = AQ_1 + BQ_2,$$

where A and B are proportional constants and $t_3$ and $t_4$ are, respectively, the start time and the finish time of the pulse period $\tau$.

The quantity of heat $W_2$ will be described in more detail. The value $W_2$ corresponds to a so-called preheating effect at the extended portion of the wire and represents the Joule heat which the wire receives for the time which elapses from the instant that the wire passes through the current feeding point until the wire reaches the arc end.

The resistances R per unit length of wire electrode which are prepared by covering soft steel wires with copper and are extensively employed for a pulse arc welding machine, and the corresponding arc's current-voltage characteristic expressions (the average length of the arc being 3 mm) are indicated in the following Table 2:

TABLE 2

| Soft steel: | |
|---|---|
| Melting point | 1535° C. |
| Latent heat | 65 cal/g |
| Specific heat | 0.15 cal/g°C. |
| Density | 7.8 g/cm³ |
| | Arc's current-voltage |

TABLE 2-continued

| Wire diameter d (mm ⌀) | Resistance per unit length r (mΩ/cm) | characteristic expression |
|---|---|---|
| 0.9 | 5.33 | V ≈ 22 + 0.048 I |
| 1.2 | 3.00 | V ≈ 15 + 0.04 I |
| 1.6 | 1.69 | V ≈ 17 + 0.028 I |

When the length of extension of the wire is increased to increase the value $Q_2$, the quantity of heat applied to the wire 20 per pulse period becomes higher than the value indicated by the curve 84 in FIG. 10 (the curve 84 corresponding to the case where $Q_1$ is a minimum). However, the quantity of heat should be set to lower than the value indicated by the curve 86 in FIG. 10 with the effect of the increased length of extension taken into account. If the molten drop diameter a can be decreased, then the length of arc can be reduced without short-circuiting the wire 20 and the base material 18. Accordingly, it is undesirable that the quantity of heat applied to the wire 20 be more than required. This means that the value $Q_1$ should be set as small as possible, and thus the time $t_3$ set to occur as late as possible. Taking into consideration the fact that the quantity of heat absorbed by the base material is substantially proportional to $Q_1$, the quantity of heat absorbed by the base material can be limited to not more than required, and hence no undercutting will occur which increases the welding speed. Thus, it can be determined that the length of extension of the wire should be a minimum of 5 mm. If the length is 5 mm, with the quantity of heat applied to the wire 20 set to the value indicated by the aforementioned curve 84, the current waveform from the main power source 26 is fixed and the remaining quantity of heat, which is 7.7 Joule (=15.1−7.4) for a wire of diameter 1.2 mm, is calculated and used as the Joule heat of the extended portion of the wire.

A specific technique for determing circuit conditions ($E_0$, $t_3$, $Q_1$ and $Q_2$) in the circuitry of the specific embodiment of the pulse arc welding machine shown in FIG. 3 will be described.

Figure 11:
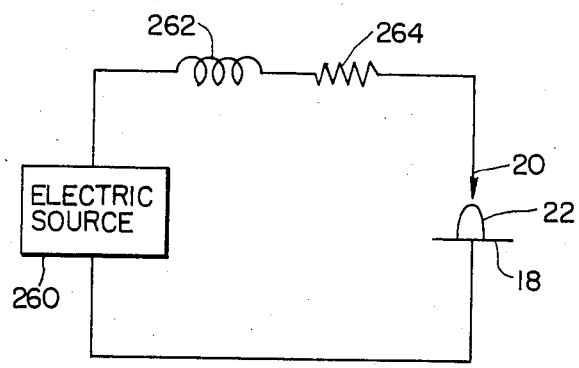
FIG. 11 is an equivalent circuit diagram of a main power source in the welding machine according to the invention.

The calculation is carried out based upon a simplified equivalent circuit corresponding to the main electric source 26 in FIG. 3. The equivalent circuit is shown in FIG. 11. In FIG. 11, reference numeral 260 designates an electric source which produces the pulse voltage waveform 10 as shown in FIG. 4A. The output circuit of the electric source 260 includes an inductance component 262 (for instance 350 μH) and a DC resistance component 264 (for instance 5 mΩ) which are provided when the above-described DC reactor 38 is taken into account. In this case, the current-voltage characteristic expression of the arc 22 is as indicated in Table 2.

Figure 12:
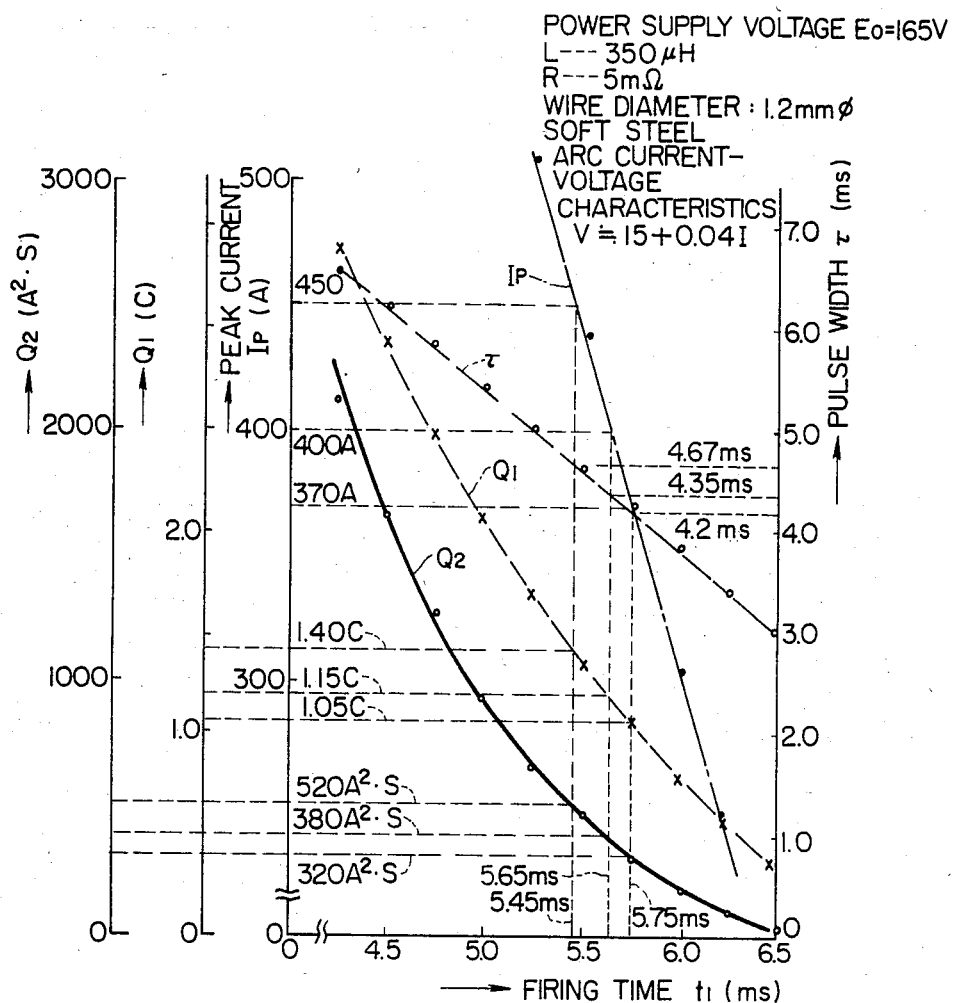
FIG. 12 is a diagram showing the results of calculation of data $I_p$, $Q_1$, $Q_2$ and employed in the invention.

FIG. 12 is a graphical indication of calculated values of $I_p$, $Q_1$, $Q_2$ and $\tau$ of the waveforms of currents which flow in the circuit shown in FIG. 11 with respect to various times $t_1$ (corresponding to the firing time $t_1$ in FIG. 4) for a wire diameter of 1.2 mm and a peak value $E_0$ of 165 V. For these calculations, the effect of the base current has been neglected as it is small. When $t_1 = 5.75$ ms, $I_p = I_c$ (=370 A). In this case, with the length of extension being 5 mm, a molten drop 1.2 mm in diameter is formed and heat energy (W) of 7.4 Joules is applied to the wire. Since the pulse wave is taken into consideration here, the critical current value also relates to the pulse wave.

Of the quantity of heat W applied to the wire, the quantity of heat $W_1$ attributed to the arc heat is proportional to $Q_1$ ($W_1 = KQ_1$) and the quantity of heat $W_2$ attributed to the Joule heat of the extending portion of the wire is proportional to $Q_2$. The relation between $W_2$ and $Q_2$ is determined as follows. A wire segment will be considered whose volume is equal to that of a molten drop (the length being represented by $\Delta l = 0.08$ mm for a wire 1.2 mm in diameter). The Joule heat which is provided per pulse is calculated from the resistance R (Ω/cm) of a unit length of the wire and the value $Q_2$ (A²S) as:

$$Q_2 \cdot R \cdot \Delta l \text{ (Joules)}.$$

If the length of extension of the wire is represented by l, then the quantity of heat absorbed by the extending portion of the wire segment is:

$$W_2 = Q_2 \times R \times \Delta l \frac{1}{\Delta l N} N = Q_2 \cdot R \text{ (Joules)},$$

where N is the number of pulses applied per unit time.

From the values of $I_p$ (=$I_c$), $Q_1$ and $Q_2$ when $t_1 = 5.75$ ms and a quantity of heat of 7.4 Joules is applied per pulse, the values $W_1$, $W_2$ and K are obtained as indicated in Table 3A below:

TABLE 3A

| Length of Extension l [mm] | d[mm⌀] | $I_c$[A] | $t_1$[mS] | τ[mS] | a[mm⌀] | Δl[mm] | $Q_1$[c] | $Q_2$[A² S] | W[J] | $W_2$[J] | $W_1$[J] | K[V] |
|---|---|---|---|---|---|---|---|---|---|---|---|---|
| 5.0 | 0.9 | 340 | 5.70 | 4.10 | 0.99 | 0.80 | 0.90 | 250 | 4.96 | 0.67 | 4.29 | 4.76 |
| | 1.2 | 450 | 5.45 | 4.67 | 1.14 | 0.69 | 1.40 | 520 | 7.40 | 0.78 | 6.62 | 4.73 |
| | 1.6 | 650 | 4.33 | 5.75 | 1.24 | 0.50 | 2.43 | 1280 | 9.40 | 1.08 | 8.32 | 3.42 |
| 20.0 | 0.9 | 275 | 5.98 | 3.60 | 0.99 | 0.80 | 0.65 | 150 | 4.96 | 1.60 | 3.36 | 5.17 |
| | 1.2 | 400 | 5.65 | 4.35 | 1.14 | 0.69 | 1.15 | 380 | 7.40 | 2.28 | 5.12 | 4.45 |
| | 1.6 | 600 | 5.00 | 5.50 | 1.24 | 0.50 | 2.13 | 1040 | 9.40 | 3.52 | 5.88 | 2.76 |
| 30.0 | 0.9 | 250 | 6.08 | 3.45 | 0.99 | 0.80 | 0.58 | 120 | 4.96 | 1.92 | 3.04 | 5.24 |
| | 1.2 | 370 | 5.75 | 4.20 | 1.14 | 0.69 | 1.05 | 320 | 7.40 | 2.88 | 4.52 | 4.30 |
| | 1.6 | 550 | 5.15 | 5.25 | 1.24 | 0.50 | 1.88 | 860 | 9.40 | 4.36 | 5.04 | 2.68 |

TABLE 3B

| Length of Extension l [mm] | d[mm⌀] | $I_{co}$[A] | $\tau_0$[mS] | a[mm⌀] | Δl[mm] | $Q_1$[c] | $Q_2$[A² S] | W[J] | $W_2$[J] | $W_1$[J] | K[V] |
|---|---|---|---|---|---|---|---|---|---|---|---|
| 5.0 | 0.9 | 300 | 2.78 | 0.99 | 0.80 | 0.83 | 249 | 4.96 | 0.66 | 4.3 | 5.18 |
| | 1.2 | 350 | 4.57 | 1.14 | 0.69 | 1.60 | 560 | 7.40 | 0.84 | 6.56 | 4.10 |
| | 1.6 | 383 | 6.60 | 1.24 | 0.50 | 2.53 | 968 | 9.40 | 0.818 | 8.58 | 3.40 |
| 20.0 | 0.9 | 240 | 2.72 | 0.99 | 0.80 | 0.65 | 157 | 4.96 | 1.67 | 3.29 | 5.06 |
| | 1.2 | 310 | 4.42 | 1.14 | 0.69 | 1.37 | 425 | 7.40 | 2.55 | 4.85 | 3.54 |
| | 1.6 | 354 | 5.85 | 1.24 | 0.50 | 2.07 | 733 | 9.40 | 2.48 | 6.92 | 3.34 |
| 30.0 | 0.9 | 218 | 2.68 | 0.99 | 0.80 | 0.58 | 127 | 4.96 | 2.03 | 2.93 | 5.05 |

TABLE 3B-continued

| Length of Extension l [mm] | d[mmØ] | $I_{co}$[A] | $\tau_0$[mS] | a[mmØ] | Δl[mm] | $Q_1$[c] | $Q_2$[$A^2$ S] | W[J] | $W_2$[J] | $W_1$[J] | K[V] |
| --- | --- | --- | --- | --- | --- | --- | --- | --- | --- | --- | --- |
| | 1.2 | 290 | 4.21 | 1.14 | 0.69 | 1.22 | 354 | 7.40 | 3.19 | 4.21 | 3.45 |
| | 1.6 | 324 | 5.76 | 1.24 | 0.50 | 1.87 | 605 | 9.40 | 3.07 | 6.33 | 3.40 |

Table 3A shows values for wire diameters 0.9 mm and 1.6 mm which are obtained in the same way as described above. If it is assumed that the values K thus obtained are constant, irrespective of $E_0$, where the wire diameter is constant, then with $I_p = I_c$ the quantities of heat W can be obtained with respect to various extension lengths where $E_0$ is other than 165 V.

Actual measured values of $I_c$ where the lengths of extension are 20 mm and 5 mm, and the results of calculation of the values $W_2$, $W_1$ and K with respect to various lengths of extension in the case where a quantity of heat of 7.4 Joules is applied under the condition of $I_p = I_c$ are also shown in Table 3A.

Table B indicates measured values of $I_{co}$ and $\tau_0$ and the results of calculation of the values $W_2$, $W_1$ and K with respect to various lengths of extension and various wire diameters in the case where a part of each wire is shifted as a molten drop of minimum diameter under the condition of $I_p = I_{co}$.

In the case where the peak current value and the pulse width of the pulse current are so determined that the quantity of heat W applied to the wire electrode per pulse is within the optimum heat quantity range as indicated in Table 1, the wire feeding speed v (cm/s), i.e., the length of wire fed per unit time, must be equal the product of the volume of a molten drop of diameter d falling, formed with one pulse and the number N of pulses per unit time (second). This can be expressed as follows:

$$\underbrace{V \times \left(\frac{d}{2}\right)^2 \times \pi \times \frac{1}{100}}_{\text{Amount of wire fed per unit time}} = \underbrace{\frac{4}{3} \times \left(\frac{a}{2}\right)^3 \times \pi \times N \times \frac{1}{1000}}_{\text{Amount of metal melted per unit time}}$$

From this expression, the wire feeding speed v (cm/s) is:

$$v = 0.0667 \times a^3 / d^2 \times N.$$

Without feeding the wire at this speed v, the welding operation cannot be achieved with the arc length maintained unchanged.

If, in order to generalize the above expression, N (the number of pulses) is transposed to the left side, then the relation between the wire feeding speed and the number of pulses is:

$$v/N = 0.0667 \times a^3 / d^2 \text{(cm/pulse)}.$$

If a value in the optimum molten drop diameter range specified in Table 1 is applied as the value a, then the following optimum ranges of v/N with respect to wire diameters are obtained:

TABLE 4

| Wire diameter d (mm) | Ratio of optimum wire feeding speed to number of pulses (cm/pulse) |
| --- | --- |
| 0.9 | 0.080–0.241 |
| 1.2 | 0.068–0.138 |
| 1.6 | 0.050–0.081 |

If the value v/N is set as indicated in Table 4, the quantity of heat applied to the wire per unit pulse is set in the optimum heat quantity range, which provides a satisfactory drop transfer welding state.

In order to maintain the arc stable, the base current must be at least 10 A. However, if an excessively large base current is employed, it is necessary to increase the capacity of the auxiliary power source. In this case, the quantity of heat applied to the wire by the base current becomes larger than that applied to the wire by the pulse current. Therefore, in order to maintain the necessary critical current value and to maintain the quantity of heat applied to the wire at a constant level, it is necessary to increase $E_0$ and $t_1$ and to decrease $\tau$. This lowers the efficiency of the transformer 30. If the base current is increased while the number of pulses applied per unit time is changed according to the wire feeding speed as described below, the ratio of the wire feeding speed to the number of pulses cannot be maintained which makes it difficult to automatically operate the welding machine. Because of the above-described reason, it is necessary to set the upper limit of the base current to 50 A.

The circuit conditions are determined as described above to obtain a satisfactory drop transfer welding condition and overall satisfactory welding conditions.

On the other hand, it is necessary for the welding machine to be capable of welding base materials of different thicknesses than specified above. That is, in the case of a thick base material 18, it is necessary to increase the average arc current, the amount of fusion and the penetration depth of the base material, and the amount of fusion of a wire, otherwise in the case of a thin base material 18, it is necessary to decrease the average arc current, the amount of fusion and penetration depth of the base material, and the amount of the fusion of a wire.

In the conventional pulse arc welding machine, mainly the peak value $I_p$ of the pulse current or the base current is changed to change the arc current according to the thickness of the base material. Accordingly, the number of circuit conditions for obtaining the above-described optimum drop shift welding state is fewer and the operability of the welding machine is considerably lower.

On the other hand, the pulse arc welding machine of the invention employs the following technique for changing the average arc current according to the thickness of a base material. The thyristor firing time $t_1$ is set to an optimum value so as to obtain the optimum heat quantity range and peak current value $I_p$ which provide the optimum drop shift welding condition. The gates of the thyristors 32 through 36 are suitably turned on and off by the pulse frequency varying circuit 40 to thin out pulses which are provided at a rate of 180 pulses per second by the main power source 26 thereby to vary the number of pulses generated per unit time.

Figure 13A:
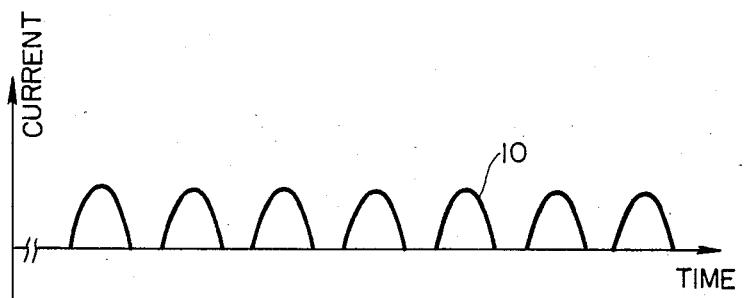
FIGS. 13A–13D are explanatory diagrams for a description of a method of thinning generated pulses.
Figure 13B:
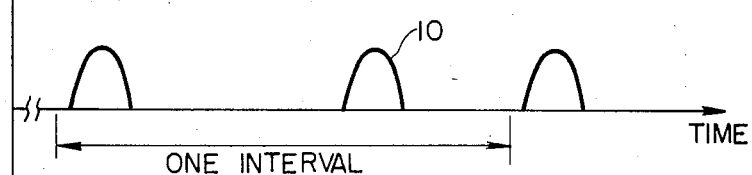
Figure 13C:
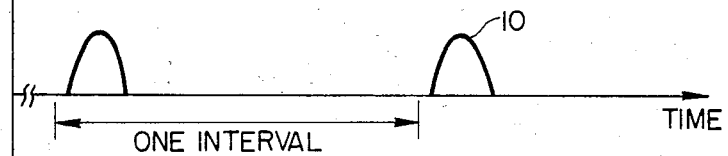
Figure 13D:
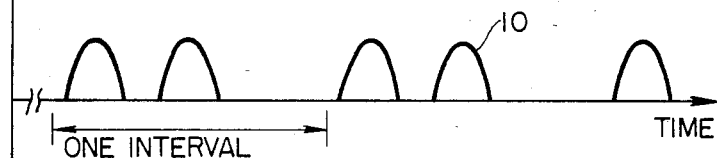

This will become more apparent from FIGS. 13A through 13D. FIG. 13A shows pulses which are generated at a rate of 180 pulses per second (360 pulses/second if the main power source 26 is of a six-phase half-wave or the three-phase full-wave and an integer multiple thereof for a power line frequency of 50 Hz). FIGS. 13B–13D show pulses the pulse rates of which are reduced to 2/5, ¼ and ⅔, respectively, that in FIG. 13A.

In the case where adjacent pulses are overlapping one another, it is difficult to separately analyze the drop shift of each pulse. However, the welding operation can still be carried out. For arc stability, it is desirable that the pulse thinning-out operation be carried out at equal intervals as indicated in FIGS. 13B–13D. The pulse frequency varying circuit 40 is so designed to perform the pulse thinning-out operation in this way.

In order to set the average arc current, the number of pulses produced per unit time is changed as described above. With proper setting of the average arc current, the optimum drop shift welding operation can be carried out for all arc currents, and hence for all base materials irrespective of thickness. Thus, the wire feeding speed is made proportional to the number of molten drops and to the number of pulses generated per unit time. Therefore, the wire feeding speed can be made substantially proportional to the number of pulses produced. This advantageous effect is applied to an automatic welding machine in accordance with the teachings of the invention.

The wire feeding speed can be made proportional to the number of pulses by the following technique.

(1) The wire feeding speed is detected by a speed detector and a signal such as a voltage proportional to the speed is produced in response thereto.

(2) The signal is sensed and applied to an electronic computer or the like and the computer performs the necessary calculation to determine the corresponding number of pulses (proportional to the signal, for instance).

(3) The number of pulses thus provided is applied to the pulse frequency varying circuit 40.

This technique prevents the creeping of the arc which occurs mainly when the arc is started (when feeding of the wire 20 is started) or when the arc is extinguished (when feeding of the wire 20 is ended), and further can prevent the wire 20 from sticking to the base material 18. The technique is employable irrespective of the type of shielding gas, the type of wire material and the wire diameter.

Figure 26:
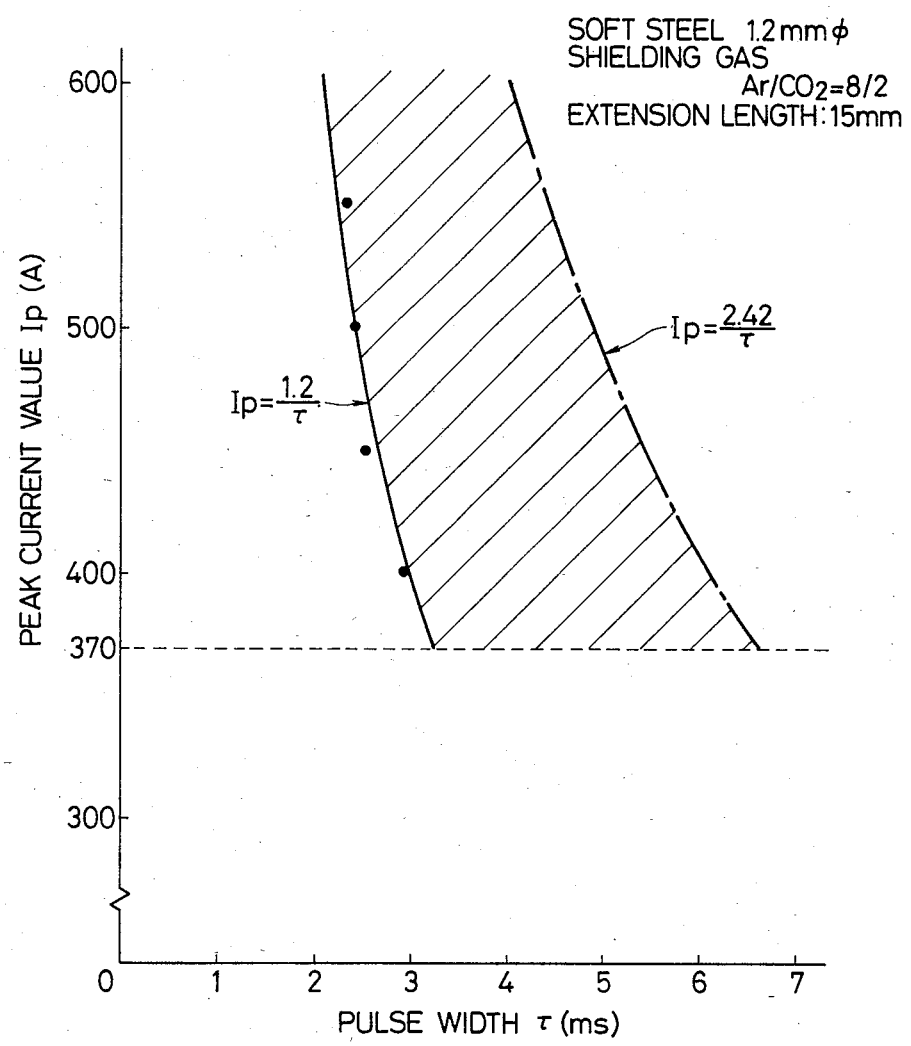
FIGS. 26–30 are graphical representations indicating peak current values with pulse widths for various electrode materials and shielding gases showing preferred ranges of operation.

The setting of the peak value $I_p$ so as to yield an optimum heat quantity for a given shielding gas type and wire diameter will now be described with reference to FIGS. 26 through 30. FIG. 26 relates to the case of a soft steel wire having a diameter of 1.2 mm and using as the shielding gas Ar and $CO_2$ in a proportion of 8:2. In this figure, the dashed line indicates the appropriate critical current value 370 A as derived from FIG. 25, the solid line corresponds to a minimum drop diameter of 1.14 mm (equivalent to a minimum heat quantity of 7.4 Joules), and the dot-dash line corresponds to a maximum molten drop diameter of 1.44 mm (equivalent to a minimum heat quantity of 15.1 Joules).

The peak current $I_p$ should be set within the range indicated by the hatched region. The solid and dot-dashed lines can be approximated by $1.2/\tau$ and $2.42/\tau$, respectively, where $\tau$ is expressed in milliseconds.

Thus, the peak current $I_p$ should be set, for the case of FIG. 26, so as to satisfy:

$$I_p \geq 370A, \text{ and}$$

$$1.2/\tau \leq I_p \leq 2.42/\tau,$$

where $\tau$ is expressed in milliseconds.

Figure 27:
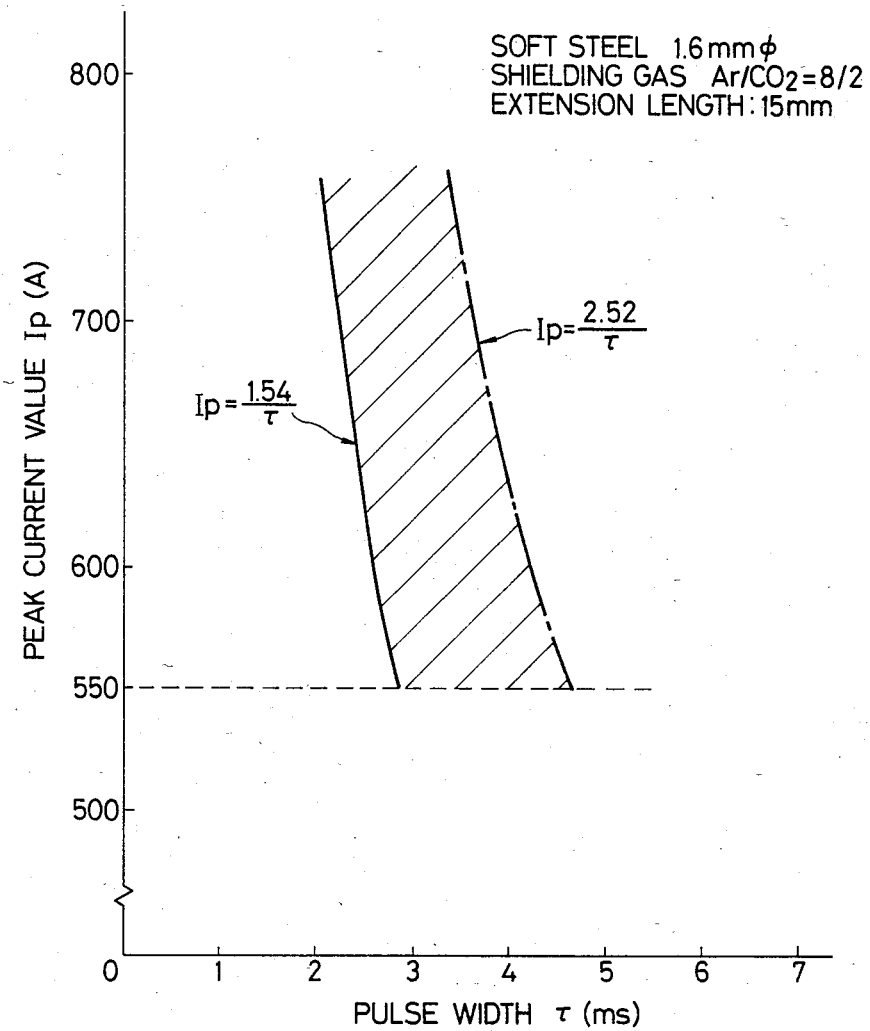

Similarly, for the case of FIG. 27 where soft steel having a diameter of 1.6 mm and employing an Ar to $CO_2$ ratio of 8:2, $I_p$ should be set to satisfy:

$$I_p \geq 550A, \text{ and}$$

$$1.54/\tau \leq I_p \leq 2.52/\tau.$$

Figure 28:
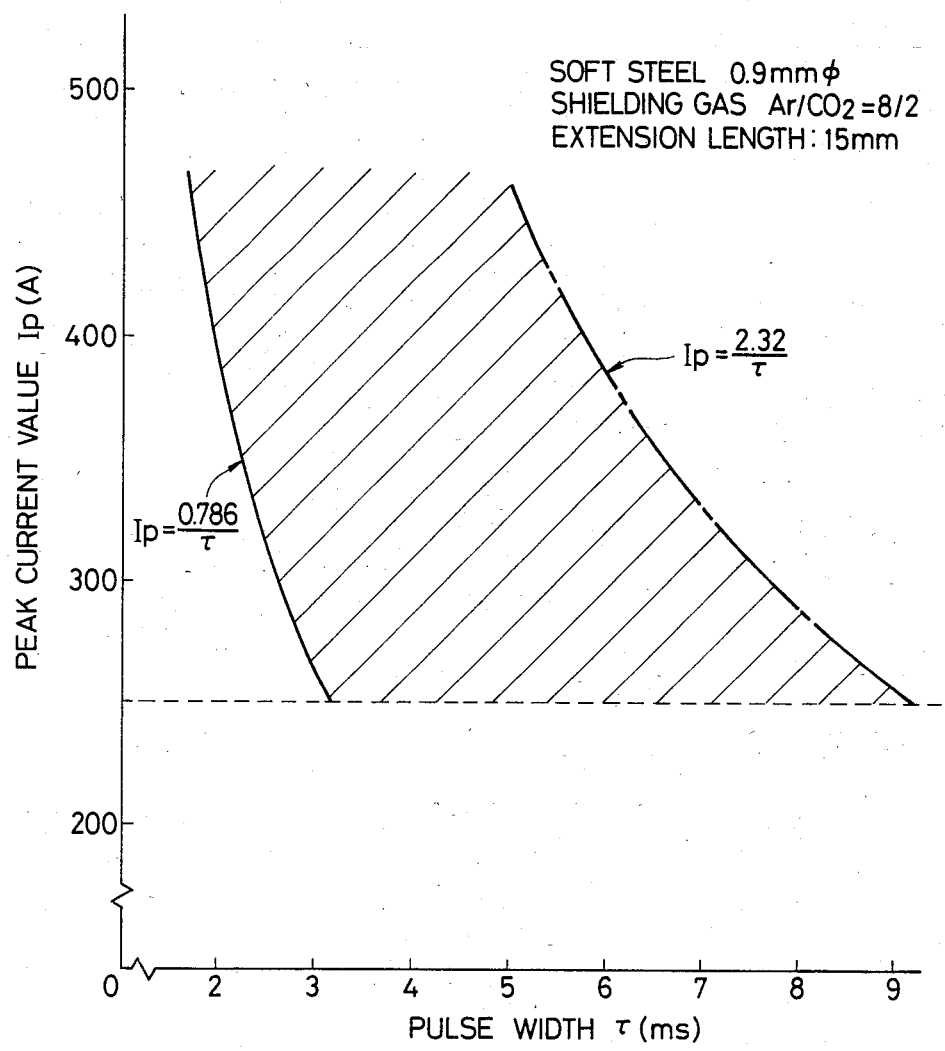

For FIG. 28, the material is soft steel having a diameter of 0.9 mm and the shielding gas is Ar and $CO_2$ in a ratio of 8:2. For these values, $I_p$ should be set to satisfy: TI $I_p \geq 250A$, and $$0.786/\tau \leq I_p \leq 2.32/\tau.$$

Figure 29:
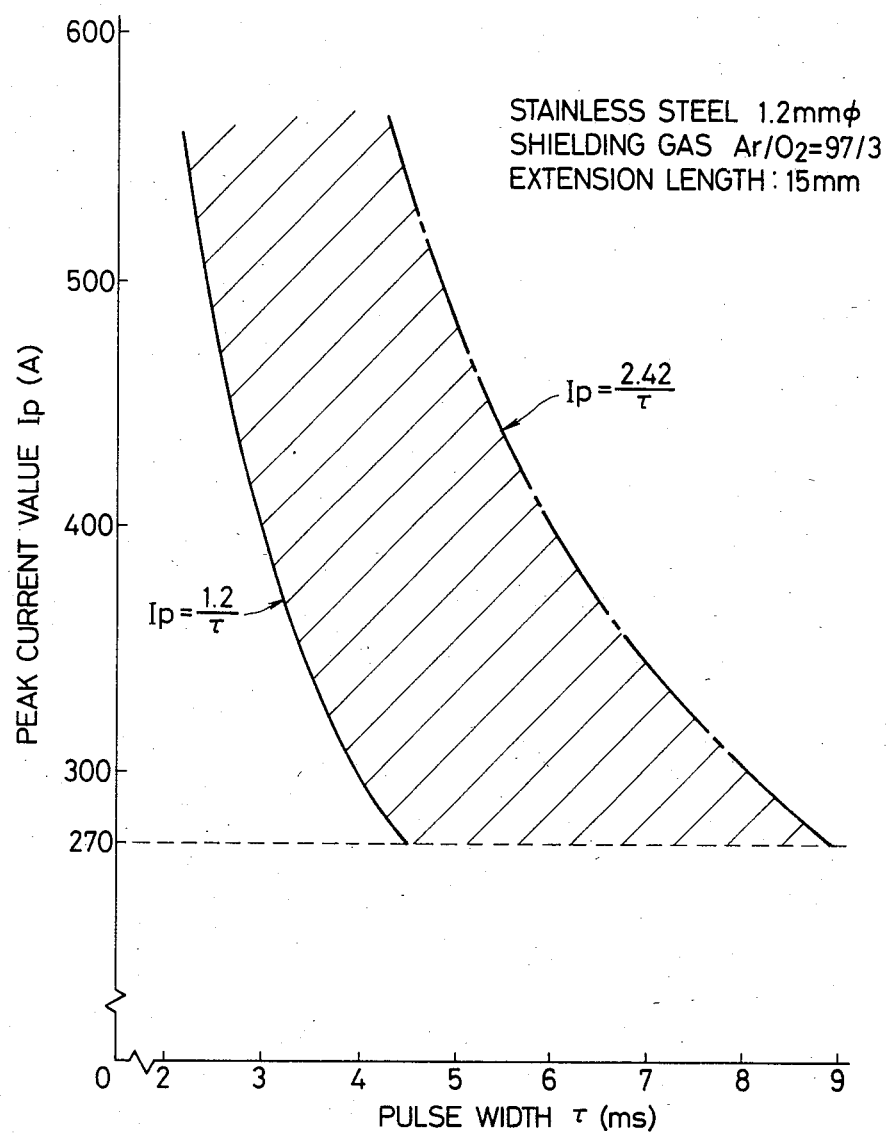

With regard to FIG. 29 in which the material is stainless steel with a diameter of 1.2 mm and the shielding gas is Ar and $CO_2$ in a ratio of 97:3, $I_p$ should be set to satisfy:

$$I_p > 270A, \text{ and}$$

$$1.2/\tau \leq I_p \leq 2.42/\tau.$$

Figure 30:
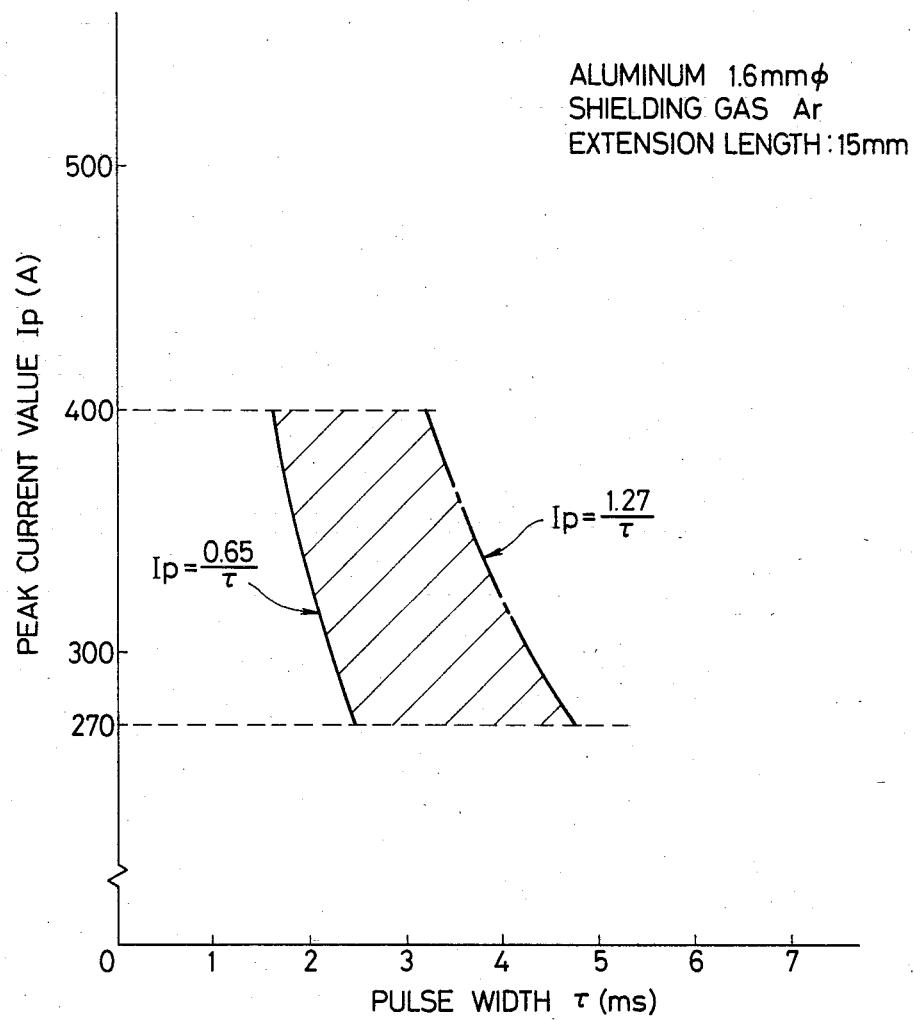

Finally, with reference to FIG. 30, the material is aluminum having a diameter of 1.6 mm and the shielding gas is Ar. For this case, $I_p$ should satisfy:

$$270 \leq I_p \leq 400A, \text{ and}$$

$$0.65/\tau \leq I_p \leq 1.27/\tau.$$

(With regard to the limit of 400 A, see FIG. 9).

As is clear from the above, soft steel wire and stainless steel wire have similar characteristics, and in both cases the critical current and optimum molten drop diameter are determined primarily by the type of shielding gas and wire diameter selected.

Figure 14:
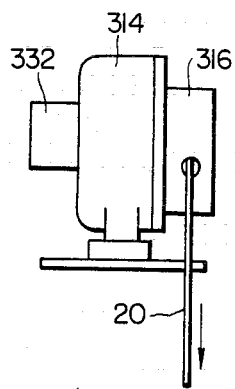
FIGS. 14 through 18 are explanatory diagrams showing various examples of a wire feeding speed detecting device of the invention.

Next, a device for detecting the wire feeding speed will be described with reference to FIG. 14. A speed detector 332 is mounted on the shaft of a wire feeding motor 314 for detecting the rate of rotation or speed of the motor 314. That is, in this example, the wire feeding speed is indirectly detected by detecting the speed of the motor 314.

Figure 15:
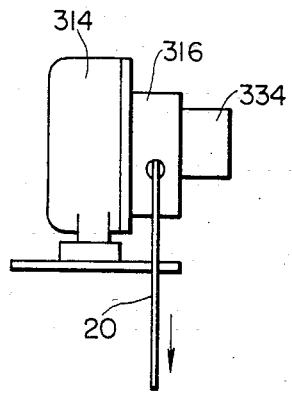

Another example of a wire feeding speed detecting device is shown in FIG. 15. In this example, a speed detector 334 is mounted on the shaft of a wire winding reel 316 which is driven by a wire feeding motor 314 for detecting the rate of rotation of the wire winding reel 316. That is, in this example, the wire feeding speed is also indirectly detected, here by detecting the speed of rotation of the wire winding reel 316.

These two examples are advantageous in the following points. First, the construction is simple and yet the wire feeding speed can be detected relatively accurately. The speed detector is commercially available. Also, the detection signal can be obtained as a current signal which can be readily processed.

Figure 16:
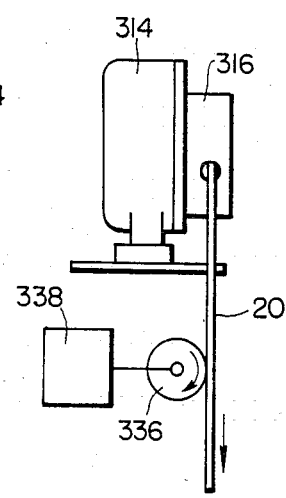

A third example of a wire feeding speed detecting device is shown in FIG. 16. A detecting roller 336 is disposed in such a manner that it is rotated by the wire 20 which is being fed. A detector 338 for detecting the rate of rotation of the roller 336 or the circumferential speed of the roller 336 is coupled to the roller 336 so that the wire feeding speed is detected directly. Therefore, the detecting device of this example is advantageous in that, for instance, the detection of the wire feeding speed is not affected by errors caused by variations of the angular speed and the circumferential speed which are produced as the number of turns of the wire 20 on the reel 316 is decreased. Accordingly, the detection can be achieved more accurately.

Figure 17:
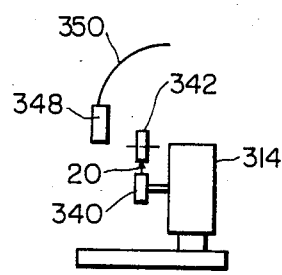
Figure 18:
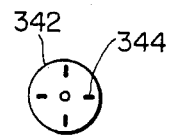

A forth example of a wire feeding device, as shown in FIG. 17, includes a wire feeding motor 314, a roller 340 driven by the motor 314, and a roller 342 which is coupled to the roller so as to sandwich the wire 20 therebetween. Elements 344 (FIG. 18) to be detected by a sensor 348 are provided on the side surface or the circumferential surface of one of the rollers 340 and 342. The sensor 348 is disposed at a predetermined distance from the roller 342 confronting the roller to detect the elements 344 which are arranged as shown in FIG. 18. In the case where an optical sensor is employed, the elements 344 to be detected may be holes cut in the roller or reflecting strips provided on the roller. In the case where a magnetic sensor is employed, metal pieces are provided on the side surface or inside of the roller. The sensor 348 is connected through a signal line 350 to the output section of the welding electric source. This wire feeding speed detecting device, similar to those shown in FIGS. 14 and 15, detects the wire feeding speed indirectly by detecting the speed of rotation of the motor.

In a fifth example of the wire feeding speed detecting device (not shown), a DC motor is employed to feed the wire electrode and a detecting circuit for detecting the counterelectromotive force of the DC motor is provided to output a counterelectromotive force detection signal from which the wire feeding speed is indirectly detected.

In FIG. 3, showing a first embodiment of a pulse arc welding machine according to the invention, the main power source 26 is a three-phase half wave source and the auxiliary power source 28 is a three-phase full wave source. However, the same effects can be obtained with power sources different from those described above.

Figure 19:
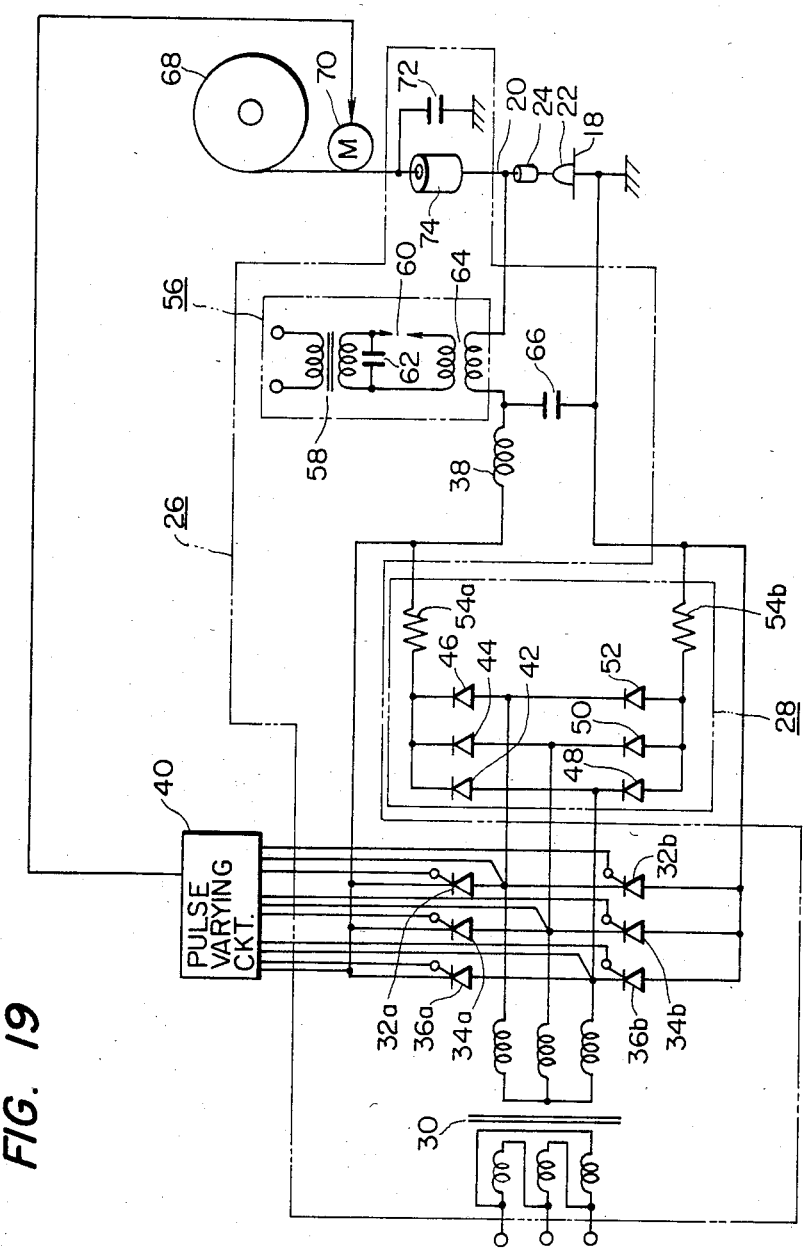
FIGS. 19, 20 and 21 are circuit diagrams showing the arrangements of second, third and fourth embodiments of a pulse arc welding machine according to the invention.

A second embodiment of a pulse arc welding machine according to the invention is shown in FIG. 19 in which both a main power source 26 and an auxiliary power source 28 are of the three-phase full wave type. However, the main power source 26 may be of the single phase type and the auxiliary power source 28 may be of a type utilizing a circuit, such as a leakage transformer, other than a resistance load circuit. In the embodiment shown in FIG. 19, the speed of a motor in a wire feeding unit 70 is varied according to the pulse frequency of a pulse frequency varying circuit 40.

Figure 20:
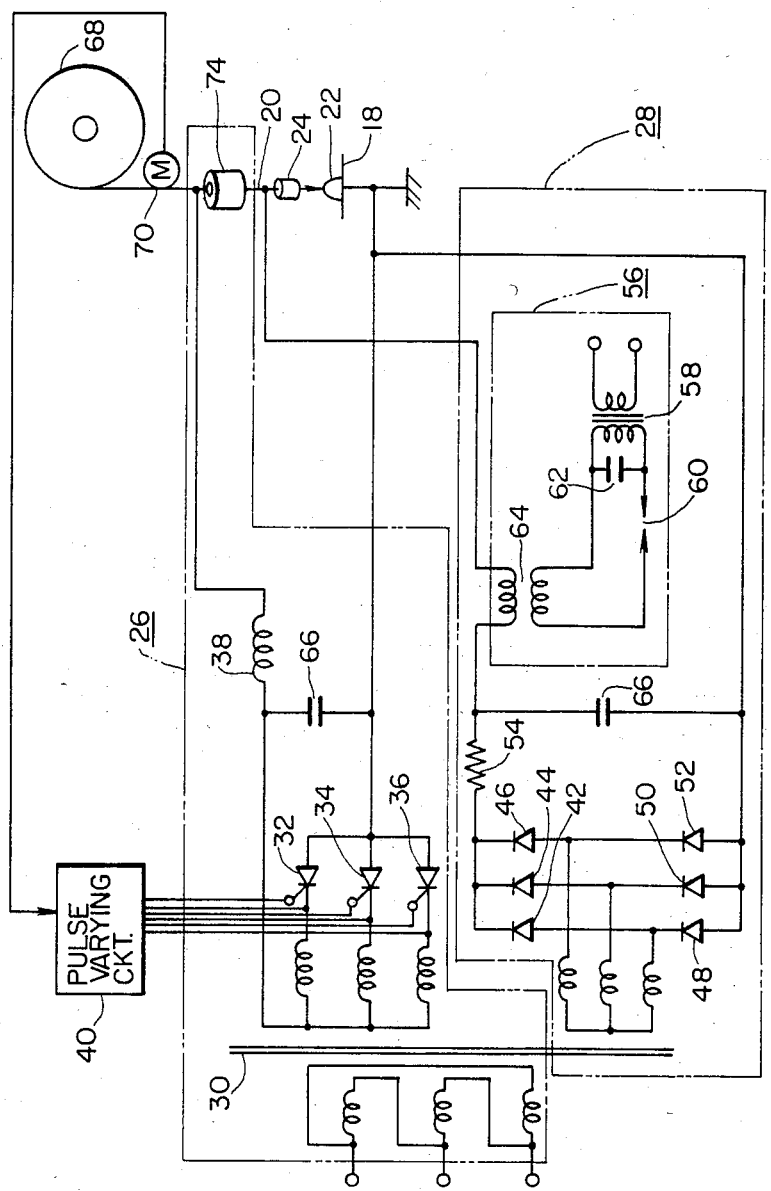

FIG. 20 shows a third embodiment of a pulse arc welding machine according to the invention. In this embodiment, a high-frequency electric source 56 is included in an auxiliary power source 28 and the size of a coupling coil is made smaller. In the welding machine shown in FIG. 20, a bypass capacitor 66 performs the function of the bypass capacitor in FIG. 3.

Figure 21:
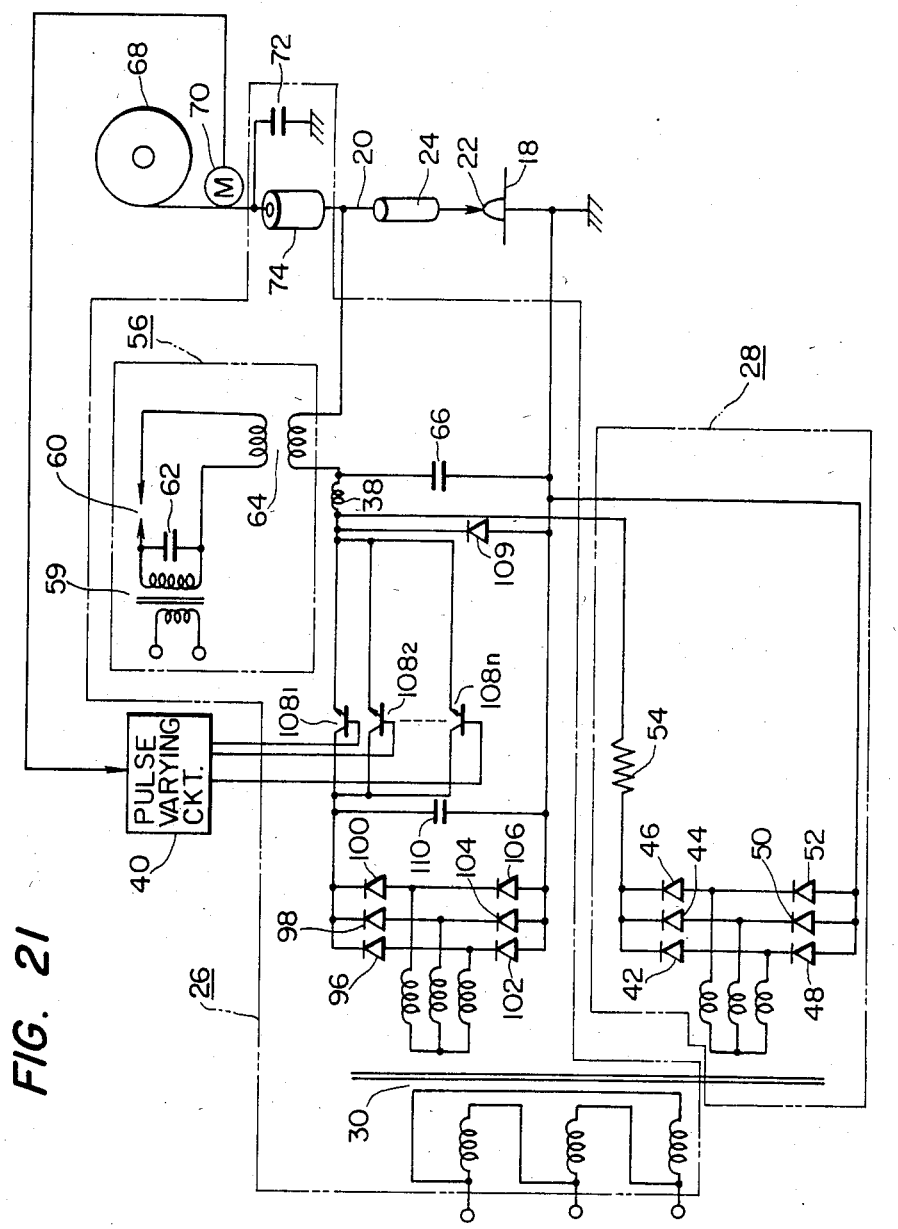

FIG. 21 shows a fourth embodiment of a pulse arc welding machine. The secondary voltage of a transformer 30 is subjected to full-wave rectification by diodes 96, 98, 100, 102, 104 and 106 and is then applied to the collectors of transistors $108_1$ through $108_n$. The transistors $108_1$ through $108_n$ are rendered conductive by trigger pulses which are outputted by a pulse frequency varying circuit 40 as a result of which a pulse current having a required frequency is applied to a DC reactor 38. As the transistors $108_1$ through $108_n$ are operated as described above, the number of pulses produced per unit time can be varied in a continuous manner. That is, the number of pulses per unit time is set by continuously changing the pause periods (corresponding to the non-conductive periods of the transistors) between the pulses. The number of parallel-connected transistors ($108_1$ through $108_n$) is suitably determined according to the current capacities of the transistors and the arc current value which are used. Parallel operation of the transistors can be stably carried out by utilizing the voltage drops across lead wires which are connected to the transistors, respectively. In FIG. 21, a diode 109 is provided to suppress surge voltages on the transistors and a capacitor 110 is provided to suppress surge voltages and to improve the rise time of the pulse current.

As is apparent from the above description, the average arc current is set by varying the number of pulses produced per unit time so that the number of pulses is proportional to the wire feeding speed. Accordingly, the welding bead is uniformly produced over a wide range of average welding current and hence over a wide range of wire feeding speeds.

Furthermore, according to the invention, the peak value of the sum of the pulse current and the base current is set to a value larger than the critical current value $I_{co}$ which is determined in accordance with one of the above-described wire electrode diameter, wire electrode material and shielding gas type. The quantity of heat applied to the wire electrode per period of the sum of the currents mentioned above is set in an optimum heat quantity range which is defined by one of the above-described wire electrode diameter, wire electrode material and shielding gas type to provide suitable drop transfer welding conditions thereby to achieve welding operations with satisfactory welding beads substantially free from splattering.

As example of the pulse frequency varying circuit 40 will be described with reference to FIG. 22 to FIG. 24.

At the commencement of welding operations, outputs A, B and C of a transformer 401, each having the same phase as the correspondingly indicated output of the transformer 30, are applied to a phase shifter 403 where they are subjected to a conversion operation to cause them to have pulse widths determined by a pulse width setting circuit 402. As indicated by A', B' and C' in the timing diagram of FIG. 24, firing is carried out at a predetermined phase angle α. Thereafter, when a reference pulse generator 405 receives from a pulse number setting circuit 404 an output signal which is obtained by converting the number of pulses representative of a wire feed and supply speed into a voltage signal, the reference pulse generator 405 operates to generate a pulse signal having a constant frequency. The operation of the generator 405 will be described in more detail.

The output signal from the pulse number setting circuit 404 is initially integrated to obtain an increasing voltage signal having a slope determined by the product RC. When the thus obtained increasing voltage signal exceeds a threshold level determined according to a voltage at a point S, a trigger pulse is applied to a switching element 407 as a result of which the increase of the signal is terminated and then abruptly decreased. The voltage appearing at a junction T then becomes zero. Consequently, the voltage signal at the junction T has a sawtooth waveform. When the voltage at the junction T is zero, the voltage at junction U decreases. Thus, the voltage signal appearing at the junction U is a pulse signal having a constant frequency.

A distributor 408 to which the outputs of the transformer 401, the phase shifter 403 and the reference pulse generator 405 are applied, operates to selectively apply its output to one of three firing devices 409. One of the devices 409 which receives the output from the distributor 408 operates to generate a firing signal at a phase angle determined by the phase shifter 403, whereby thyristors 32, 34 and 36 are triggered successively to produce a pulse current.

Figure 22:
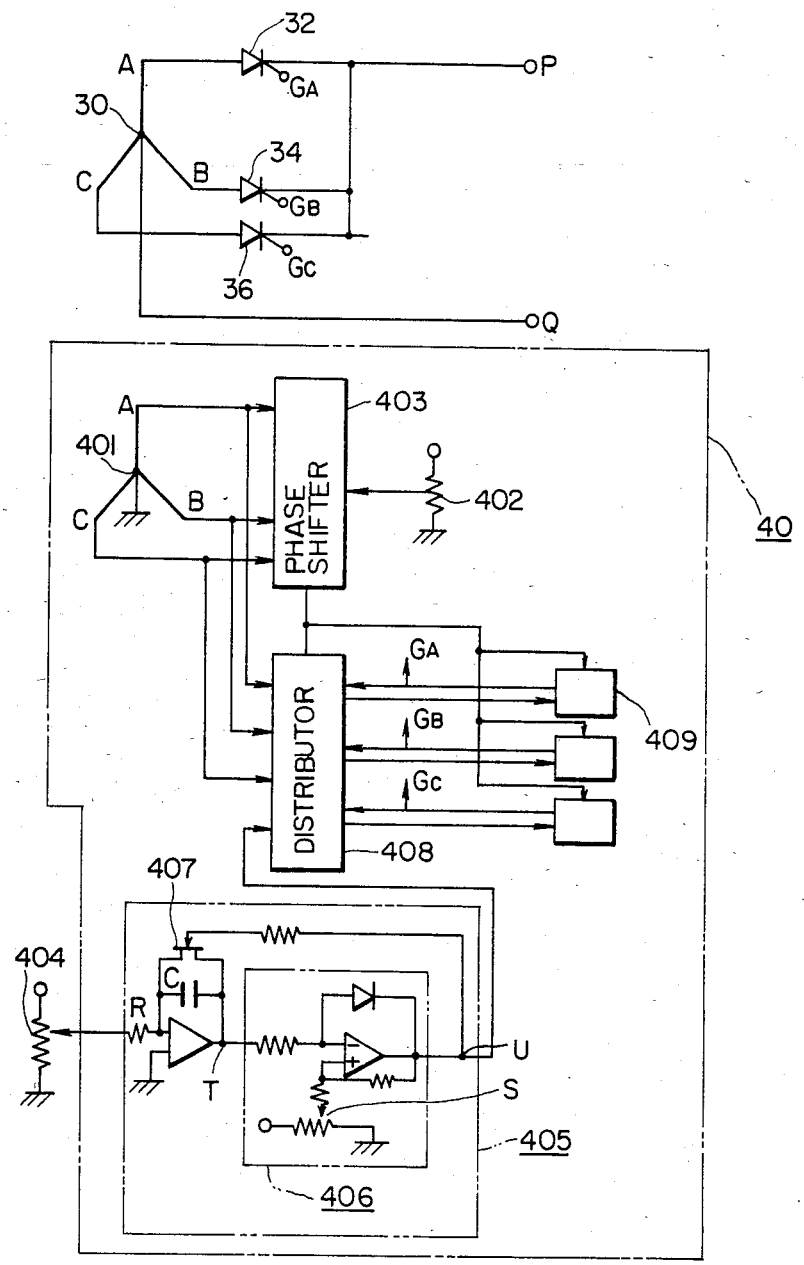
FIGS. 22 and 23 are schematic diagrams of a pulse varying circuit used in the invention.
Figure 23:
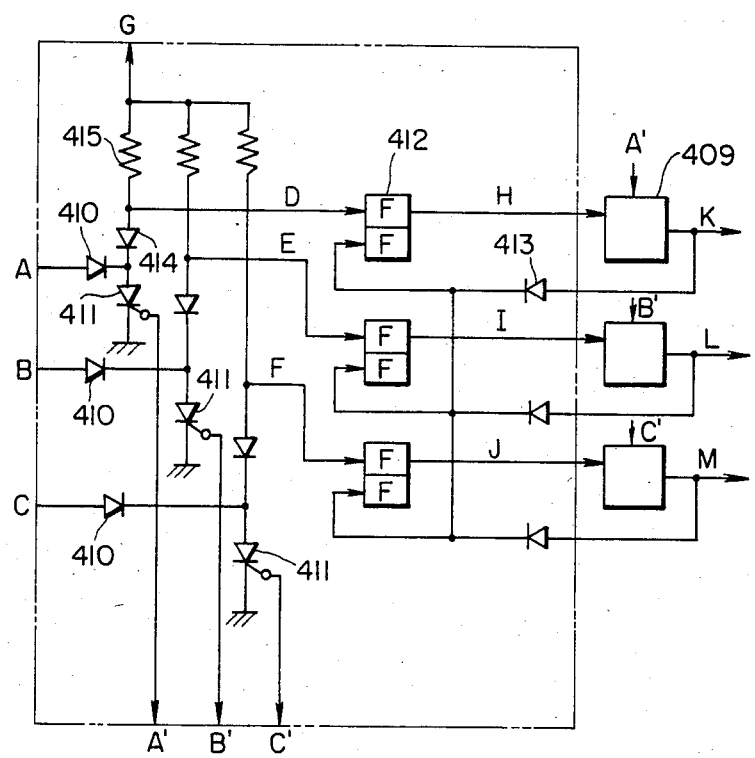
Figure 24:
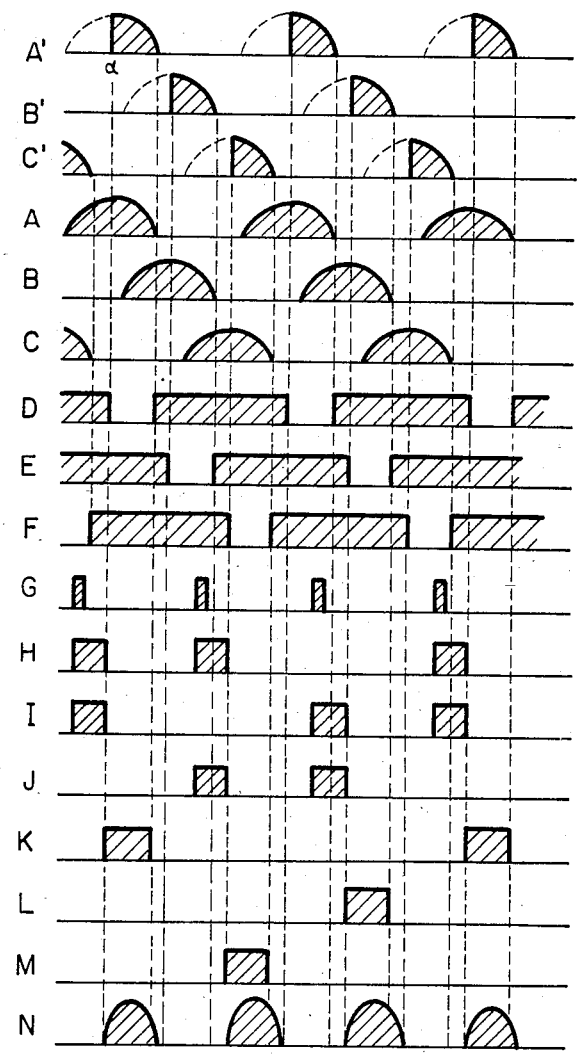
FIG. 24 is a timing diagram showing waveforms in the circuit of FIGS. 22 and 23.

FIG. 23 is a circuit diagram showing an example of the distributor 408 shown in FIG. 22. The outputs A, B and C as shown in FIG. 24 are applied through diodes 410 to corresponding ones of switching elements 411. To the gate of the switching elements 411 are applied the outputs A', B' and C' of the phase shifter 403 which are fired at the phase angle α. To this end, as indicated by D, E and F, when the outputs of the phase shifter 403 are applied to the distributor 408, the switching elements 411 are turned on to thereby make the potential at the set input terminals to the flip-flop circuits 421 approximately zero. When the input terminals are at zero volts, even if the pulse signal G is supplied from the reference pulse generator 405, no set signals are applied to the flip-flop circuits 412. During high voltage periods of the pulse signal D, E and F, which are indicated by hatched areas in FIG. 24, upon reception of the pulse signal G from the reference pulse generator 405, the flip-flop circuits 412 are respectively set so as to produce outputs indicated by H, I and J which are applied to a firing device 409. The outputs of the phase shifter 403 are also applied to respective ones of the firing devices 409. The firing devices 409 generate signals corresponding to the outputs of the phase shifter 403 in phase with trigger signals H, I and J, whereby pulse signals indicated by K, L and M in FIG. 24 are applied to the gates of the thyristors 32, 34 and 36 as gate trigger signals. As a result, the thyristors 32, 34 and 36 are fired successively in response to the outputs of the devices 409 to thereby produce a pulse current indicated by N in FIG. 103.

The outputs of the devices 409 are also fed back to reset terminals of the flip-flop circuits 412 via diodes 413. Accordingly, when one of the devices 409 generates its output, all of the flip-flop circuits 412 are reset. In this case, due to the diodes 413, interference with the operation of the devices 409 is eliminated. A diode 414 is provided so that the outputs A, B and C of the transformer 401 cannot set the flip-flop circuits 412 directly. Further, a resistor 415 is provided so that excessive current from the reference pulse generator 405 which may occur when the switching element 411 is turned on is blocked.

With respect to the embodiment shown in FIG. 21 in which switching transistors are employed, the above-described circuit is also applicable. In this case, a sawtooth waveform signal determined by the slope RC is generated by the reference pulse generator 405, and then firing pulses each having a constant frequency are applied to the transistors $108_1$ to $108_n$ in response to the thus obtained signal.

We claim:

1. A method for operating a pulse arc welding machine of a type in which a wire electrode is fed by a welding torch confronting a base material in such a manner that the wire electrode is maintained spaced from the base material, comprising the steps of:
   supplying a shielding gas to a welding area of said base material;
   feeding said wire electrode to said welding torch;
   supplying a base current between said wire electrode and said pulse material;
   supplying a pulse current between said wire electrode and said base material; and
   varying a number of pulses per unit time of said pulse current in proportion to a speed of feeding said wire electrode;
   wherein, in said steps of supplying said base current and supplying said pulse current, a peak value of a composite current of said base current and said pulse current is set so that a quantity of heat applied to said wire electrode and a molten drop diameter formed, for soft steel, are determined by:

| Wire diameter d (mm ∅) | Optimum molten drop diameter range (mm ∅) | Optimum heat quantity range (J) |
|---|---|---|
| 0.9 | 0.99–1.43 | 4.96–14.6 |
| 1.2 | 1.14–1.44 | 7.4–15.1 |
| 1.6 | 1.24–1.46 | 9.4–15.7 |

2. A method for operating a pulse arc welding machine of a type in which a wire electrode is fed by a welding torch confronting a base material in such a manner that the wire electrode is maintained spaced from the base material, comprising the steps of:
   supplying a shielding gas to a welding area of said base material;
   feeding said wire electrode to said welding torch;
   supplying a base current between said wire electrode and said pulse material;
   supplying a pulse current between said wire electrode and said base material; and
   varying a number of pulses per unit time of said pulse current in proportion to a speed of feeding said wire electrode;
   wherein, in said step of feeding said wire electrode to said welding torch and in said step of applying said pulse current, a ratio of an optimum wire feeding speed to a number of pulses of said pulse current is determined by:

| Wire diameter d (mm) | Ratio of optimum wire feeding speed to number of pulses (cm/pulse) |
|---|---|
| 0.9 | 0.080–0.241 |
| 1.2 | 0.068–0.138 |
| 1.6 | 0.050–0.081 |

3. A method for operating a pulse arc welding machine of a type in which a wire electrode is fed by a welding torch confronting a base material in such a manner that the wire electrode is maintained spaced from the base material, comprising the steps of:
   supplying a shielding gas to a welding area of said base material;

feeding a wire electrode to said welding torch;
supplying a base current between said wire electrode and base material;
supplying a pulse current between said wire electrode and said base material; and
varying a number of pulses per unit of time of said pulse current in proportion to a feeding speed of said wire electrode;
wherein, said wire electrode is soft steel wire having a diameter of 1.2 mm and said shielding gas comprises Ar and $CO_2$ in a ratio of 8:2, and a peak value $I_p$ of said pulse current is set in accordance with:

$$I_p \geq 370A, \text{ and}$$

$$1.2/\tau \leq I_p \leq 2.42/\tau,$$

where $\tau$ is a width of said pulses in milliseconds.

4. The method as claimed in claim 3, wherein a ratio of said wire electrode feeding speed to said number of pulses is 0.068–0.138 cm per pulse.

5. A method for operating a pulse arc welding machine of a type in which a wire electrode is fed by a welding torch confronting a base material in such a manner that the wire electrode is maintained spaced from the base material, comprising the steps of:
supplying a shielding gas to a welding area of said base material;
feeding a wire electrode to said welding torch;
supplying a base current between said wire electrode and base material;
supplying a pulse current between said wire electrode and said base material; and
varying a number of pulses per unit of time of said pulse current in proportion to a feeding speed of said wire electrode;
wherein, said wire electrode is soft steel wire having a diameter of 1.6 mm and said shielding gas comprises Ar and $CO_2$ in a ratio of 8:2, and a peak value $I_p$ of said pulse current is set in accordance with:

$$I_p \geq 550A, \text{ and}$$

$$1.54/\tau \leq I_p \leq 2.52/\tau,$$

where $\tau$ is a width of said pulses in milliseconds.

6. The method as claimed in claim 5, wherein an optimum molten drop diameter range for said wire electrode is 1.24–1.46 mm, and an optimum heat quantity range applied to said wire electrode is 9.4–15.7 mm.

7. A method for operating a pulse arc welding machine of a type in which a wire electrode is fed by a welding torch confronting a base material in such a manner that the wire electrode is maintained spaced from the base material, comprising the steps of:
supplying a shielding gas to a welding area of said base material;
feeding a wire electrode to said welding torch;
supplying a base current between said wire electrode and base material;
supplying a pulse current between said wire electrode and said base material; and
varying a number of pulses per unit of time of said pulse current in proportion to a feeding speed of said wire electrode;
wherein, said wire electrode is soft steel wire having a diameter of 0.9 mm and said shielding gas comprises Ar and $CO_2$ in a ratio of 8:2, and a peak value $I_p$ of said pulse current is set in accordance with:

$$I_p \geq 250A, \text{ and}$$

$$0.786/\tau \leq I_p \leq 2.32/\tau,$$

where $\tau$ is a width of said pulses in milliseconds.

8. The method as claimed in claim 7, wherein an optimum molten drop diameter range for said electrode is 0.99–1.43 mm, and an optimum heat quantity range applied to said wire electrode is 4.96–14.6 Joules.

9. The method as claimed in claim 7 wherein a ratio of said wire electrode feeding speed to said number of pulses is 0.080–0.241 cm per pulse.

10. A method for operating a pulse arc welding machine of a type in which a wire electrode is fed by a welding torch confronting a base material in such a manner that the wire electrode is maintained spaced from the base material, comprising the steps of:
supplying a shielding gas to a welding area of said base material;
feeding a wire electrode to said welding torch;
supplying a base current between said wire electrode and base material;
supplying a pulse current between said wire electrode and said base material; and
varying a number of pulses per unit of time of said pulse current in proportion to a feeding speed of said wire electrode;
wherein, said wire electrode is stainless steel wire having a diameter of 1.2 mm and said shielding gas comprises Ar and $CO_2$ in a ratio of 97:3, and a peak value $I_p$ of said pulse current is set in accordance with:

$$I_p \geq 270A, \text{ and}$$

$$1.2/\tau \leq I_p \leq 2.42/\tau,$$

where $\tau$ is a width of said pulses in milliseconds.

11. The method as claimed in either of claims 3 and 10, wherein an optimum molten drop diameter range for said wire electrode is 1.14–1.44 mm, and an optimum heat quantity range applied to said wire electrode is 7.4–15.1 Joules.

12. A method for operating a pulse arc welding machine of a type in which a wire electrode is fed by a welding torch confronting a base material in such a manner that the wire electrode is maintained spaced from the base material, comprising the steps of:
supplying a shielding gas to a welding area of said base material;
feeding a wire electrode to said welding torch;
supplying a base current between said wire electrode and base material;
supplying a pulse current between said wire electrode and said base material; and
varying a number of pulses per unit of time of said pulse current in proportion to a feeding speed of said wire electrode;
wherein, said wire electrode is aluminum wire having a diameter of 1.6 mm and said shielding gas comprises Ar, and a peak value $I_p$ of said pulse current is set in accordance with:

$$270 \leq I_p \leq 400A, \text{ and}$$

$$0.65/\tau \leq I_p \leq 1.27/\tau,$$

where $\tau$ is a width of said pulses in milliseconds.

13. The method as claimed in either of claims 5 and 12, wherein the ratio of said wire electrode feeding speed to said number of pulses is 0.050–0.081 cm per pulse.

14. A method of operating a pulse arc welding machine of a type in which a wire electrode is fed by a welding torch confronting a base material in such a manner that the wire electrode is maintained spaced from the base material, comprising the steps of:

supplying a shielding gas to a welding area of said base material;

feeding a wire electrode to said welding torch;

supplying a base current between said wire electrode and said base material;

supplying a pulse current between said wire electrode and said base material; and varying the number of pulses per unit time of said pulse current in proportion to a feeding speed of said wire electrode;

wherein said wire electrode has a diameter in a range of 0.9 to 1.6 mm, and said shielding gas comprises at least Ar, and wherein a peak value $I_p$ of said pulse current is set in accordance with:

$I_p \geq 250A$, and $0.65/\tau \leq I_p \leq 2.52/\tau$, where $\tau$ is a width of said pulses in milliseconds.

* * * * *